United States Patent
Izuru

(10) Patent No.: US 10,828,532 B2
(45) Date of Patent: Nov. 10, 2020

(54) RIDING POSTURE OUTPUTTING DEVICE

(71) Applicant: Shimano Inc., Sakai (JP)

(72) Inventor: Yuji Izuru, Kanagawa (JP)

(73) Assignee: Shimano Inc., Osaka (JP)

( * ) Notice: Subject to any disclaimer, the term of this patent is extended or adjusted under 35 U.S.C. 154(b) by 222 days.

(21) Appl. No.: 15/524,386

(22) PCT Filed: Nov. 7, 2014

(86) PCT No.: PCT/JP2014/079640
§ 371 (c)(1),
(2) Date: May 4, 2017

(87) PCT Pub. No.: WO2016/072029
PCT Pub. Date: May 12, 2016

(65) Prior Publication Data
US 2018/0280761 A1 Oct. 4, 2018

(51) Int. Cl.
| A63B 24/00 | (2006.01) |
| A63B 69/16 | (2006.01) |
| B62J 45/20 | (2020.01) |
| B62J 45/40 | (2020.01) |

(52) U.S. Cl.
CPC .......... A63B 24/0062 (2013.01); A63B 69/16 (2013.01); *A63B 2230/62* (2013.01); *B62J 45/20* (2020.02); *B62J 45/40* (2020.02)

(58) Field of Classification Search
CPC . A63B 24/0062; A63B 69/16; A63B 2230/62; B62J 45/20; B62J 45/40
See application file for complete search history.

(56) References Cited

U.S. PATENT DOCUMENTS

| 7,599,806 B2* | 10/2009 | Hauschildt | A61B 5/221 |
| | | | 702/44 |
| 8,011,242 B2* | 9/2011 | O'Neill | G01L 3/242 |
| | | | 73/379.01 |
| 10,180,368 B2* | 1/2019 | Smit | G01L 5/00 |
| 2013/0210583 A1 | 8/2013 | Kametani et al. | |

FOREIGN PATENT DOCUMENTS

| JP | 2003-116822 | 4/2003 |
| JP | 2013-095306 | 5/2013 |
| WO | WO 2012/056558 | 5/2012 |

OTHER PUBLICATIONS

International Search Report, PCT/JP2014/079640, dated Jan. 13, 2015.

* cited by examiner

*Primary Examiner* — Justin N Olamit
(74) *Attorney, Agent, or Firm* — Alleman Hall Creasman & Tuttle LLP

(57) ABSTRACT

Provided is a riding posture outputting device that is able to determine a riding posture with accuracy. The riding posture outputting device includes a communication unit which acquires a crank rotation angle θ of a bicycle, and a propulsion force and a loss force which are added to a crank in the crank rotation angle θ, and a determination unit which determines whether a user is dancing on the basis of the crank rotation angle θ when the load calculated from the propulsion force Ft and the loss force Fr is maximized. Then, the communication unit outputs a determination result obtained by the determination of the determination unit.

8 Claims, 17 Drawing Sheets

RIDING POSTURE OUTPUTTING DEVICE

TECHNICAL FIELD

The present invention relates to a riding posture outputting device which outputs a riding posture of a driver of a man-powered machine equipped with a crank.

BACKGROUND ART

Conventionally, there is a device which is mounted in a bicycle and displays information on running of the bicycle and information on exercise of a driver. Such type of device receives data from a sensor provided in the bicycle, and calculates and displays predetermined information. As the displaying information, there is a force (torque) which is added to a pedal by the driver.

In addition, in the type of device, various types of data may also be analyzed after running to utilize the analyzed data to the next exercise and training.

For example, in the bicycle, it is useful to grasp whether the riding posture of the driver is out of a saddle (dancing) or sitting (seated). For example, since a weight is applied to the pedal in the case of the dancing, a force becomes large, but a transfer efficiency is degraded compared to the case of the sitting. Therefore, there is a demand for grasping an appropriate ratio of the dancing in a running course in order to reflect the ratio to the subsequent running.

The determination on the dancing is disclosed, for example, in Patent Literature 1 in which a gyro sensor is used for the determination.

CITATION LIST

Patent Literature

Patent Literature 1: JP 2013-95306 A

SUMMARY OF INVENTION

Technical Problem

In a case where the dancing is determined using the gyro sensor disclosed in Patent Literature 1, the gyro sensor is necessary to be attached in a case where the gyro sensor is not attached in advance. In addition, in a case where the bicycle is inclined at a curve, there is a possibility to erroneously determine the dancing. Alternatively, there is a possibility to erroneously determine the dancing when the bicycle is not inclined as the sitting.

The invention has been made in view of the above problems, and an object thereof is to provide a riding posture outputting device which can determine and output a riding posture with accuracy.

Solution to Problem

In order to solve the above issue, the invention according to a first aspect of the present invention is a riding posture outputting device including: an acquisition unit that acquires angle information on a rotation angle of a crank of a man-powered machine, and force information on a force applied to the crank in a rotation angle; and an output unit that outputs information regarding a riding posture of a driver of the man-powered machine on the basis of the angle information and the force information.

The invention according to a second aspect of the present invention is a riding posture outputting method including: acquiring angle information on a rotation angle of a crank of a man-powered machine and force information on a force applied to the crank in the rotation angle; and outputting a riding posture of a driver of the man-powered machine on the basis of the angle information and the force information.

The invention according to a third aspect of the present invention is a riding posture outputting program for causing a computer to execute the riding posture outputting method according to the second aspect.

The invention according to a fourth aspect of the present invention is a computer-readable storage medium that stores the riding posture outputting program according to the third aspect.

DESCRIPTION OF EMBODIMENTS

Figure 1:
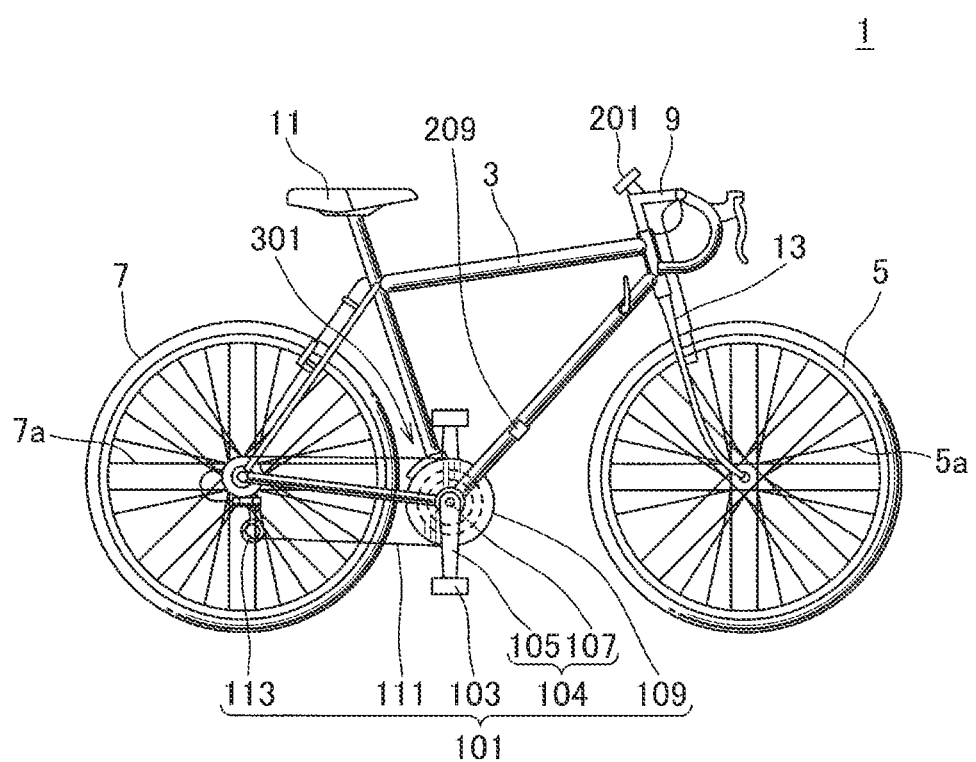
FIG. 1 is an explanatory diagram illustrating the entire configuration of a bicycle according to a first embodiment of the invention.

Hereinafter, a riding posture outputting device according to an embodiment of the invention will be described. In the riding posture outputting device according to an embodiment of the invention, an acquisition unit acquires angle information on the rotation angle of the crank of a man-powered machine and force information on a force which is added to the crank in the rotation angle. An output unit determines a riding posture of a driver of the man-powered machine on the basis of the angle information when the force information enters a predetermined state, and outputs information on the determined riding posture. In this way, the riding posture can be determined on the basis of the angle information and the force information. Therefore, since there is no need to take account of the posture of a bicycle itself which is determined on the basis of a gyro sensor, the riding posture can be determined with accuracy.

In addition, the predetermined state may be a state where the magnitude or the component of a force becomes a maximum value in a predetermined period on the basis of the force information. In this way, the riding posture can be determined on the basis of the rotation angle of the crank when the force applied to the crank is maximized.

In addition, the force information may include information on the component of a force in a rotational direction of the crank among the forces added to the crank. In this way, the riding posture can be determined on the basis of the maximum value of the component of the force in the rotational direction of the crank.

In addition, the output unit may determine the riding posture on the basis of the rotation angle of the crank of which the force applied to the crank enters the predetermined state, and the rotation angle of the crank of which the component of the force in the rotational direction enters the predetermined state. In this way, the riding posture can be determined from a value based on two evaluation directions. For example, the riding posture may be determined with higher accuracy by the evaluation together with grading the respective results.

The output unit may determine the riding posture on the basis of a predetermined threshold with respect to the angle information when the force information enters the predetermined state. In this way, the riding posture may be easily determined only by the comparison with the rotation angle of the crank when the rotation angle becomes the threshold and the maximum.

In addition, the acquisition unit acquires information on the component of a force in a longitudinal direction of the crank among the forces added to the crank as the force information. The output unit may determine the riding posture on the basis of at least any one or more of the rotation angle of the crank of which the force applied to the crank enters the predetermined state and the rotation angle of the crank of which the component of the force in the rotational direction enters the predetermined state, and at least any one or more of the variation of the component of the force in the longitudinal direction in a predetermined period, a comparison value between the information on the component of the force in the rotational direction when the component of the force in the rotational direction enters the predetermined state in the predetermined period and the information on the component of the force in the longitudinal direction when the component of the force in the longitudinal direction enters the predetermined state, and a comparison value between the rotation angle of the crank when the component of the force in the rotational direction enters the predetermined state in the predetermined period and the rotation angle of the crank when the component of the force in the longitudinal direction enters the predetermined state. In this way, the riding posture can be determined from the value based on a plurality of evaluation directions. For example, the riding posture may be determined with higher accuracy by the evaluation together with grading the respective results.

In addition, the output unit may determine the riding posture on the basis of the angle information and a predetermined threshold which is set for each variation value or the comparison value. In this way, the riding posture can be easily determined only by comparing the rotation angle of the crank which becomes the threshold and the maximum value and the variation value or the comparison value.

In addition, the output unit determines whether the driver pedals out of a saddle. In this way, it is possible to determine whether the driver pedals out of the saddle on the basis of the angle information and the force information.

In addition, the predetermined period may be within a predetermined angular range including a predetermined threshold which is set with respect to the rotation angle of the crank. In this way, the riding posture can be determined on the basis of the angle information and the force information only in the vicinity of the threshold. Therefore, a memory capacity for storing the angle information and the force information can be made small.

In addition, the predetermined period may be a period corresponding to n rotations of the crank (n is a natural number of "1" or more). In this way, it is possible to determine the riding posture on the basis of the angle information and the force information of the crank which rotates one or more times. Therefore, since the determination can be based on a lot of information, it is possible to determine the riding posture with higher accuracy.

In addition, a riding posture outputting method according to an embodiment of the invention acquires the angle information on the rotation angle of the crank of the man-powered machine and the force information on the force applied to the crank in the rotation angle in an acquisition process. Then, the riding posture of the driver of the man-powered machine is determined on the basis of the angle information when the force information enters the predetermined state in an output process, and the information on the determined riding posture is output. In this way, the riding posture can be determined on the basis of the angle information and the force information. Therefore, since there is no need to take account of the posture of a bicycle itself which is determined on the basis of a gyro sensor, the riding posture can be determined with accuracy.

In addition, the riding posture outputting method may be implemented by a riding posture outputting program which is executed by a computer. In this way, the riding posture can be determined using the computer on the basis of the angle information and the force information. Therefore, since there is no need to take account of the posture of a bicycle itself which is determined on the basis of a gyro sensor, the riding posture can be determined with accuracy.

In addition, the riding posture outputting program may be stored in a computer-readable recording medium. In this way, the program can be distributed even using a single device other than being embedded in the mechanism, so that a version is easily updated.

First Embodiment

The riding posture outputting device according to a first embodiment of the invention will be described with reference to FIGS. 1 to 12. First, the description will be given about a configuration that the riding posture outputting device collects information necessary for determining the riding posture of the driver. In other words, the description will be given for example about the configuration of a sensor attached to the bicycle to collect the information necessary for determining whether the driver (user) of the bicycle (the man-powered machine) is dancing or sitting as a riding posture.

A bicycle 1 includes a frame 3, a front wheel 5, a rear wheel 7, a handle 9, a saddle 11, a front fork 13, and a driving mechanism 101 as illustrated in FIG. 1.

The frame 3 is configured by two truss structures. The frame 3 is rotatably connected to the rear wheel 7 in a tip portion on the back side. In addition, the front fork 13 is rotatably connected on the front side of the frame 3.

The front fork 13 is connected to the handle 9. The front fork 13 and the front wheel 5 are rotatably connected in a tip position in the downward direction of the front fork 13.

The front wheel 5 includes a hub portion, a spoke portion, and a tire portion. The hub portion is rotatably connected to the front fork 13. Then, the hub portion and the tire portion are connected by the spoke portion.

The rear wheel 7 includes the hub portion, the spoke portion, and the tire portion. The hub portion is rotatably connected to the frame 3. Then, the hub portion and the tire portion are connected by the spoke portion. The hub portion of the rear wheel 7 is connected to a sprocket 113 which will be described below.

The bicycle 1 includes the driving mechanism 101 which converts a stepping force (pedaling force) of a user's foot into a driving force of the bicycle 1. The driving mechanism 101 includes a pedal 103, a crank mechanism 104, a chain ring 109, a chain 111, and the sprocket 113.

The pedal 103 is a portion where the user's foot abuts on for stepping. The pedal 103 is rotatably supported by a pedal crank shaft 115 of the crank mechanism 104.

Figure 4:
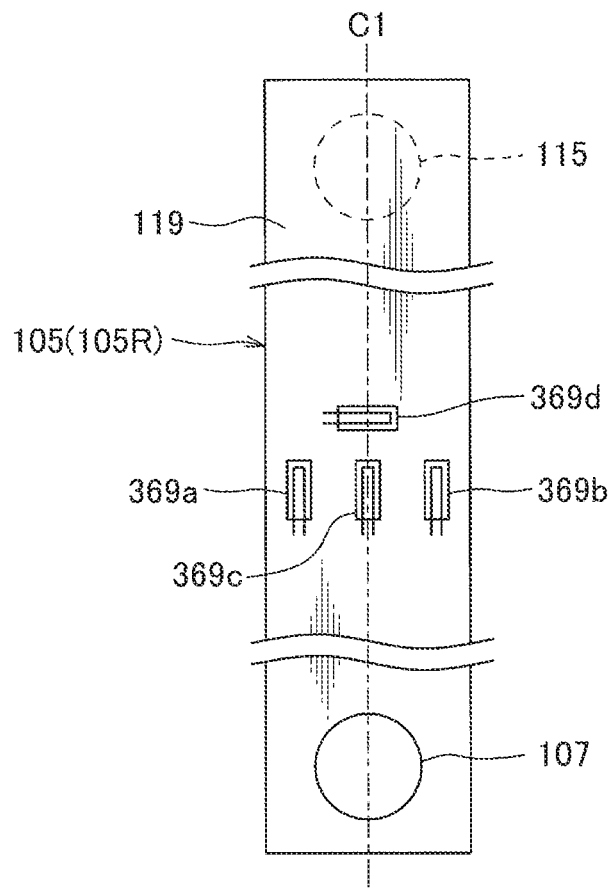
FIG. 4 is an explanatory diagram of a layout of a strain gauge in a crank illustrated in FIG. 3.

The crank mechanism 104 is configured by the crank 105, a crank shaft 107, and the pedal crank shaft 115 (see also FIGS. 4 and 6).

The crank shaft 107 passes through the frame 3 in the right and left direction (from one side to the other side of the side of the bicycle). The crank shaft 107 is rotatably supported by the frame 3. In other words, the crank shaft serves as a rotation shaft of the crank 105.

The crank 105 is provided to form the right angle with respect to the crank shaft 107. The crank 105 is connected to the crank shaft 107 in one end.

The pedal crank shaft 115 is provided to form the right angle with respect to the crank 105. The axial direction of the pedal crank shaft 115 is the same as that of the crankshaft 107. The pedal crank shaft 115 is connected to the crank 105 in the other end of the crank 105.

The crank mechanism 104 also has such a structure on the opposite side of the side surface of the bicycle 1. In other words, the crank mechanism 104 has two cranks 105 and two pedal crank shafts 115. Therefore, the pedal 103 is also provided in either side of the bicycle 1.

In a case where the right or left pedal of the bicycle 1 is discriminated, a right crank 105R, a left crank 105L, a right pedal crank shaft 115R, a left pedal crank shaft 115L, a right pedal 103R, and a left pedal 103L are denoted.

In addition, the right crank 105R and the left crank 105L are connected to extend in the opposite direction with the crank shaft 107 as the center. The right pedal crank shaft 115R, the crank shaft 107, and the left pedal crank shaft 115L are formed in parallel and become flush with each other. The right crank 105R and the left crank 105L are formed in parallel and become flush with each other.

The chain ring 109 is connected to the crank shaft 107. The chain ring 109 is desirably configured by a variable gear which can change a gear ratio. In addition, the chain 111 is engaged with the chain ring 109.

The chain 111 is engaged with the chain ring 109 and the sprocket 113. The sprocket 113 is connected to the rear wheel 7. The sprocket 113 is desirably configured by a variable gear.

The bicycle 1 converts the user's stepping force caused by the driving mechanism 101 into a rotational force of the rear wheel.

Figure 2:
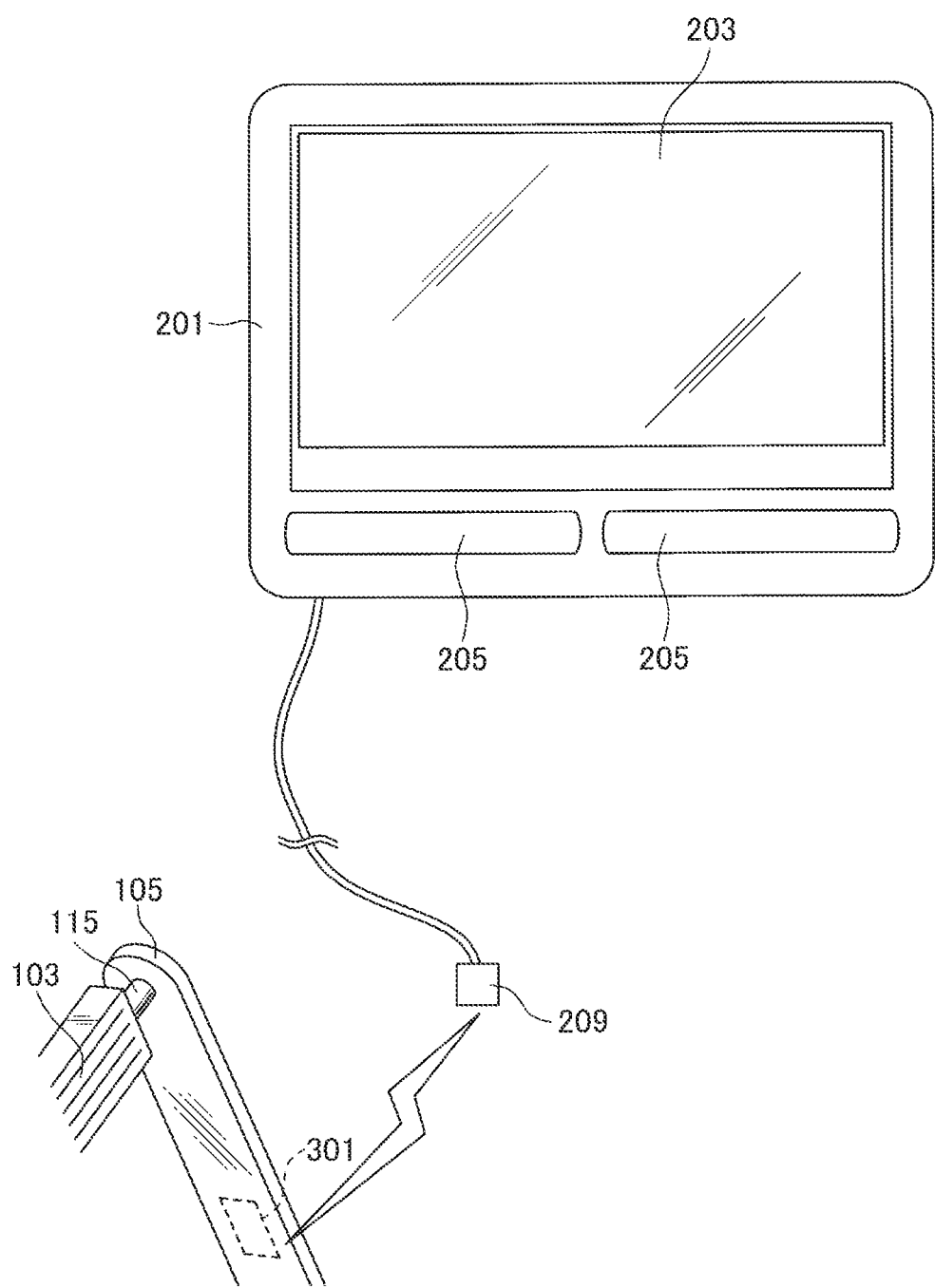
FIG. 2 is an explanatory diagram illustrating a positional relation between a cycle computer and a measurement module illustrated in FIG. 1.

The bicycle 1 includes a cycle computer 201 and the measurement module 301 (see also FIG. 2).

The cycle computer 201 is disposed in the handle 9. The cycle computer 201 includes, as illustrated in FIG. 2, a cycle computer display unit 203 which displays various types of information, and a cycle computer operating unit 205 which receives a user's operation.

The various types of information to be displayed in the cycle computer display unit 203 includes a speed of the bicycle 1, location information, a distance to a destination, an estimated arrival time at a destination, a travel distance after departure, an elapsed time after departure, a propulsion force and a loss force at every angle of the crank 105, and efficiency.

Herein, the propulsion force is a magnitude of a force applied in the rotational direction of the crank 105. On the other hand, the loss force is a magnitude of a force applied in a direction other than the rotational direction of the crank 105. The force applied in a direction other than the rotational direction is a waste force which does not attribute to the driving of the bicycle 1. Therefore, the user can more efficiently drive the bicycle 1 by increasing the propulsion force as much as possible, and by decreasing the loss force as much as possible. In other words, these forces are added to the corresponding crank 105 at the time when the crank 105 rotates The cycle computer operating unit 205 is illustrated as a push button in FIG. 2, but not limited thereto. Various types of input units such as a touch panel and a plurality of input units may be used in combination.

In addition, the cycle computer 201 includes a cycle computer wireless receiving unit 209. The cycle computer wireless receiving unit 209 is connected to a main part of the cycle computer 201 through a cable. Further, the cycle computer wireless receiving unit 209 does not necessarily only have the receiving function. For example, the cycle computer wireless receiving unit may have a function as a transmitting unit. Hereinafter, even a device described as a transmitting unit or a receiving unit may have both receiving and transmitting functions.

The measurement module 301 is provided in an inner surface of the crank 105 for example, and detects an input (pedaling force) added by the user onto the pedal 103 using a strain gauge 369 (see FIGS. 3 and 4) which is configured by a plurality of strain gauge elements. Specifically, the propulsion force (the rotational force of the crank 105, serving as a driving force of the bicycle 1) and the loss force (a force applied in a direction different from the rotational direction) are calculated. In addition, the measurement module 301 detects the rotation angle of the crank 105 using a crank rotation angle detecting sensor 2 described below.

In addition, the measurement module 301 can obtain a cadence [rpm] using a magnetic sensor 22 of the crank rotation angle detecting sensor 2. In other words, the measurement module 301 has also a function of a cadence sensor.

Figure 3:
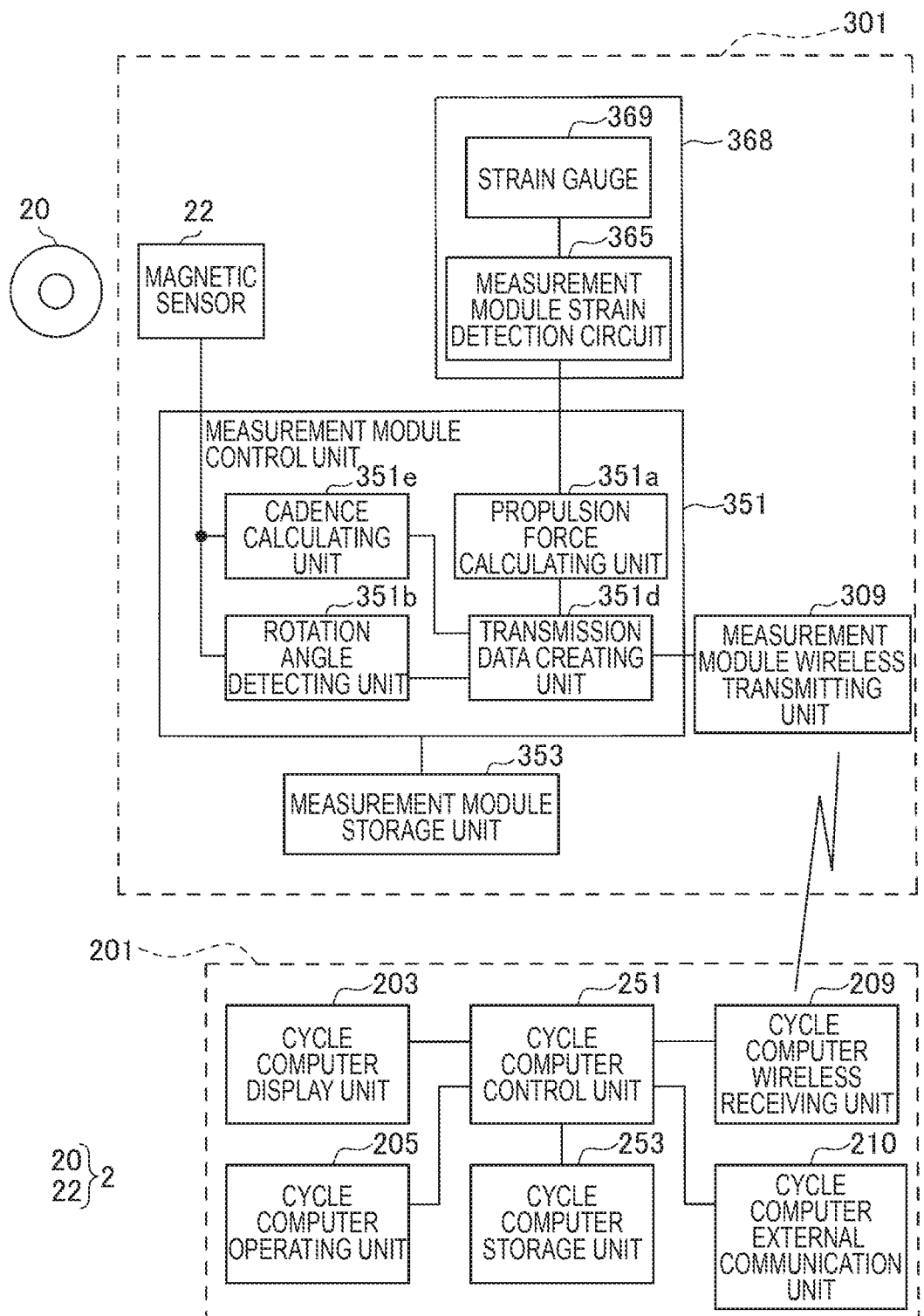
FIG. 3 is a block diagram of the cycle computer and the measurement module illustrated in FIG. 1.

FIG. 3 is a block diagram of the cycle computer 201 and the measurement module 301.

First, a block configuration of the measurement module 301 will be described. The measurement module 301 includes a measurement module wireless transmitting unit 309, a measurement module control unit 351, a measurement module storage unit 353, a power sensor 368, and the magnetic sensor 22 as illustrated in FIG. 3.

The measurement module wireless transmitting unit 309 transmits the propulsion force and the loss force calculated by the measurement module control unit 351 on the basis of strain information, and the rotation angle and the cadence of the crank 105 to the cycle computer wireless receiving unit 209.

The measurement module control unit 351 comprehensively controls the measurement module 301. The measurement module control unit 351 includes a propulsion force calculating unit 351a, a rotation angle detecting unit 351b, a transmission data creating unit 351d, and a cadence calculating unit 351e.

The propulsion force calculating unit 351a calculates the propulsion force and the loss force on the basis of the strain information output by the power sensor 368. A method of calculating the propulsion force and the loss force will be described below.

The rotation angle detecting unit 351b detects the rotation angle of the crank 105 on the basis of the detection result of the magnetic sensor 22 of the crank rotation angle detecting sensor 2, and controls timing for acquiring the strain information. A method of detecting the rotation angle of the crank 105 will be described below.

The cadence calculating unit 351e detects the number of times n (rpm) indicating that a reference magnet 21a (described below) passes by a second element 22b of the magnetic sensor 22 per unit time (1 minute) on the basis of the detection result of the magnetic sensor 22, and thus detects the rotation frequency of the crank 105 per unit time.

The transmission data creating unit 351d creates transmission data on the basis of the propulsion force and the loss force calculated by the propulsion force calculating unit 351a, the rotation angle of the crank 105 detected by the rotation angle detecting unit 351b, and the cadence calculated by the cadence calculating unit 351e, and outputs the transmission data to the measurement module wireless transmitting unit 309.

The measurement module storage unit 353 stores various types of information therein. For example, various types of information include a control program of the measurement module control unit 351, and temporary information which is necessary when the measurement module control unit 351 performs the control.

The power sensor 368 includes the strain gauge 369 and a measurement module strain detection circuit 365. The strain gauge 369 is bonded to the crank 105 to be integrated. The strain gauge 369 is configured by a first strain gauge 369a, a second strain gauge 369b, a third strain gauge 369c, and a fourth strain gauge 369d (see FIG. 4). Then, the respective terminals of the strain gauge 369 are connected to the measurement module strain detection circuit 365.

FIG. 4 is a diagram illustrating an example of a layout of the strain gauge 369 in the crank 105 in this embodiment. The strain gauge 369 is bonded to an inner surface 119 of the crank 105. The inner surface of the crank 105 is a surface from which the crank shaft 107 protrudes (connected), and a surface (side surface) in parallel to a plane containing a circle defined by a rotational motion of the crank 105. In addition, while not illustrated in FIG. 4, an outer surface 120 of the crank 105 is a surface which faces the inner surface 119 and from which the pedal crank shaft 115 protrudes (bonded). In other words, the outer surface is a surface where the pedal 103 is rotatably provided. An upper surface 117 of the crank 105 elongates in the longitudinal direction which is the same direction as that of the inner surface 119 and the outer surface 120, and is one surface perpendicular to the inner surface 119 and the outer surface 120. A lower surface 118 of the crank 105 is a surface facing the upper surface 117.

The first strain gauge 369a and the second strain gauge 369b have the detection direction in parallel to the longitudinal direction of the crank 105, and in other words are provided in parallel to the central axis C1 of the inner surface 119 and symmetrically to the central axis C1 of the inner surface 119. The third strain gauge 369c is provided on the central axis C1, and the detection direction is in parallel to the central axis C1 and interposed by the first strain gauge 369a and the second strain gauge 369b. The fourth strain gauge 369d is provided on the central axis C1 such that the detection direction is perpendicular to the longitudinal direction of the crank 105, and in other words is perpendicular to the central axis C1 of the inner surface 119.

In other words, a direction (the longitudinal direction of FIG. 4) in parallel to the central axis C1 extending in the longitudinal direction of the crank 105 (that is, a direction in parallel to the longitudinal direction of the crank 105) becomes the detection direction of the first strain gauge 369a, the second strain gauge 369b, and the third strain gauge 369c. A direction (a lateral direction of FIG. 4) perpendicular to the central axis C1 (that is, a direction perpendicular to the longitudinal direction of the crank 105) becomes the detection direction of the fourth strain gauge 369d. Therefore, the first to third strain gauges 369a to 369c are perpendicular to the fourth strain gauge 369d in the detection direction.

Further, the layout of the first to fourth strain gauges 369a to 369d is not limited to FIG. 4. In other words, any other layout may be employed as long as a parallel or perpendicular relation with respect to the central axis C1 is kept. However, the first strain gauge 369a and the second strain gauge 369b are symmetrically disposed with the central axis C1 interposed therebetween, and the third strain gauge 369c and the fourth strain gauge 369d are disposed on the central axis C1, so that each deformation described below can be desirably detected with accuracy.

In addition, in FIG. 4, the crank 105 has been described as a simple rectangular body, but may be configured with rounded corners or a partially curved surface. Even in such a case, each deformation described below can be detected by disposing the strain gauge 369 to strongly keep the above layout. However, the detection accuracy is degraded as the relation (parallel or perpendicular) with respect to the central axis C1 is deviated.

The measurement module strain detection circuit 365 is configured by connecting the first strain gauge 369a, the second strain gauge 369b, the third strain gauge 369c, and the fourth strain gauge 369d to output a strain amount of the strain gauge 369 as a voltage. The output of the measurement module strain detection circuit 365 is converted by an A/D converter (not illustrated) from analog information into a strain information signal (digital information). Then, the strain information signal is output to the propulsion force calculating unit 351a of the measurement module control unit 351.

Figure 5:
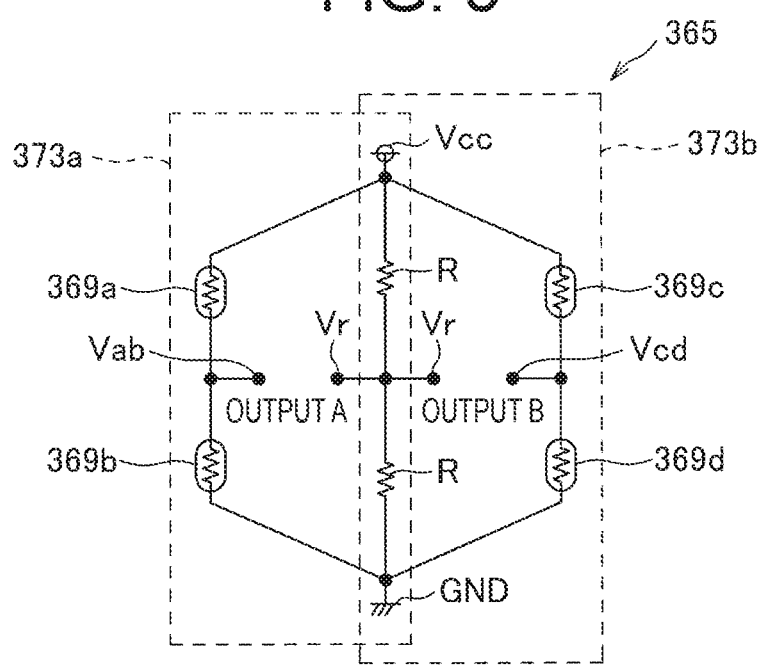
FIG. 5 is a circuit diagram of a measurement module strain detection circuit illustrated in FIG. 3.

An example of the measurement module strain detection circuit 365 is illustrated in FIG. 5. The measurement module strain detection circuit 365 is configured by two bridge circuits (a first detection circuit 373a and a second detection circuit 373b). On a side near a first system of the first detection circuit 373a, the first strain gauge 369a and the second strain gauge 369b are connected in this order from a power source Vcc. In other words, the first strain gauge 369a and the second strain gauge 369b are connected in series with respect to the power source Vcc. On a side near a second system, a fixed resistor R and a fixed resistor R are sequentially connected from the power source Vcc. On aside near the first system of the second detection circuit 373b, the third strain gauge 369c and the fourth strain gauge 369d are connected in this order from the power source Vcc. In other words, the third strain gauge 369c and the fourth strain gauge 369d are connected in series with respect to the power source Vcc. On a side near the second system, the fixed resistor R and the fixed resistor R are sequentially connected from the power source Vcc.

In other words, two fixed resistors R are shared by the first detection circuit 373a and the second detection circuit 373b. Herein, two fixed resistors R have the same resistance value. In addition, two fixed resistors R have the same resistance value as that before the strain gauge 369 is compressed or extends. Further, the first to fourth strain gauges 369a to 369d have the same resistance value.

The resistance value of the strain gauge 369 rises in the case of being compressed, and falls in the case of extending as it is well known. The variation in resistance value is proportional in a case where the variation amount is less. In addition, the detection direction of the strain gauge 369 is a direction that the wire extends, and corresponds to a direction where the first strain gauge 369a, the second strain gauge 369b, and the third strain gauge 369c are in parallel to the central axis C1, and a direction that the fourth strain gauge 369d is perpendicular to the central axis C1 as described above. In a case where the compression or the extension occurs in a direction other than the detection direction, the resistance value does not change in the strain gauge 369.

In a case where the compression or the extension does not occur in the detection direction of the first strain gauge 369a and the second strain gauge 369b, the first detection circuit 373a using the strain gauge 369 having such a characteristic detects almost zero potential difference between a potential Vab between the first strain gauge 369a and the second strain gauge 369b and a potential Vr between two fixed resistors R.

In a case where the first strain gauge 369a is compressed and the second strain gauge 369b extends, the resistance value of the first strain gauge 369a is decreased and the resistance value of the second strain gauge 369b is increased. Therefore, the potential Vab is increased, and the potential Vr is not changed. In other words, the potential difference occurs between the potential the potential Vab and the potential Vr. In a case where the first strain gauge 369a extends and the second strain gauge 369b is compressed, the resistance value of the first strain gauge 369a is increased and the resistance value of the second strain gauge 369b is decreased. Therefore, the potential Vab is lowered, and the potential Vr is not changed. In other words, the potential difference occurs between the potential the potential Vab and the potential Vr.

In a case where the first strain gauge 369a and the second strain gauge 369b are compressed together, the resistance values of the first strain gauge 369a and the second strain gauge 369b are decreased together. Therefore, the potential difference between the potential Vab and the potential Vr becomes almost zero. In a case where the first strain gauge 369a and the second strain gauge 369b extend together, the resistance values of the first strain gauge 369a and the second strain gauge 369b are increased. Therefore, the potential difference between the potential Vab and the potential Vr becomes almost zero.

The second detection circuit 373b also operates similar to the first detection circuit 373a. In other words, in a case where the third strain gauge 369c is compressed and the fourth strain gauge 369d extends, a potential Vcd becomes high, the potential Vr becomes low, and a potential difference is generated between the potential Vcd and the potential Vr. In a case where the third strain gauge 369c extends and the fourth strain gauge 369d is compressed, the potential Vcd becomes low, the potential Vr becomes high, and the potential difference between the potential Vcd and the potential Vr is generated. In a case where the third strain gauge 369c and the fourth strain gauge 369d are compressed together, and a case where the third strain gauge 369c and the fourth strain gauge 369d extend together, the potential difference between the potential Vcd and the potential Vr becomes almost zero.

Therefore, a connection point between the first strain gauge 369a and the second strain gauge 369b where the potential Vab of the first detection circuit 373a can be measured and a connection point of two fixed resistors R where the potential Vr can be measured are set to the output (hereinafter, referred to as output A) of the first detection circuit 373a. A connection point between the third strain gauge 369c and the fourth strain gauge 369d where the potential Vcd of the second detection circuit 373b can be measured and a connection point of two fixed resistors R where the potential Vr can be measured are set to the output (hereinafter, referred to as output B) of the second detection circuit 373b. The output A and the output B become the strain information.

Figure 6A:
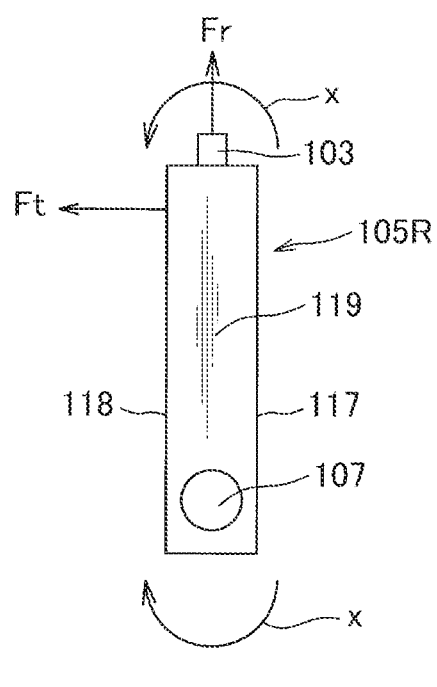
FIGS. 6A to 6C are explanatory diagrams of forces added to a right crank and deformation.
Figure 6B:
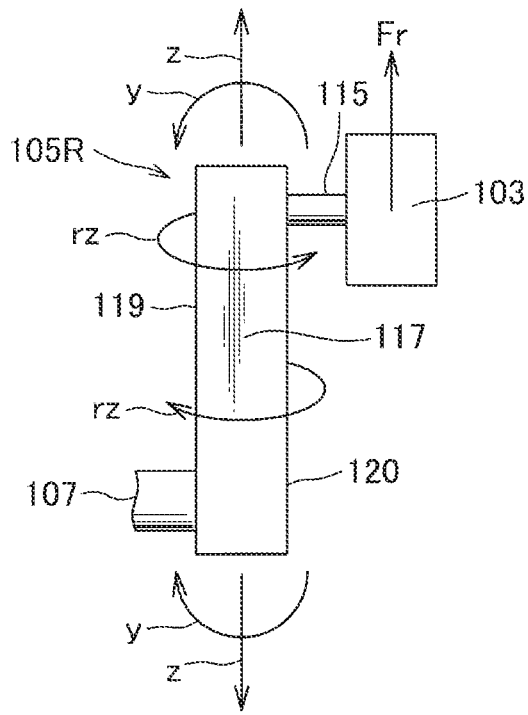
Figure 6C:
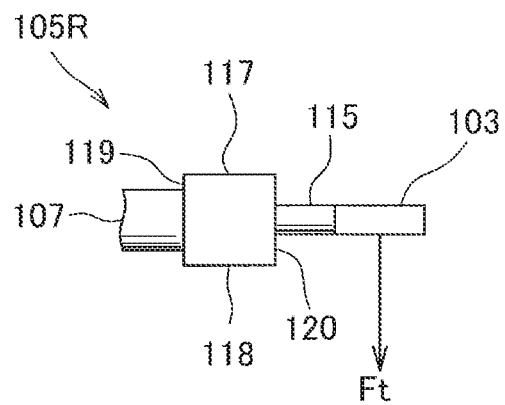

FIGS. 6A to 6C illustrate a deformation state of the right crank 105R when a force (pedaling force) is added by the user. FIG. 6A is a plan view when viewed from the inner surface 119 of the right crank 105R, FIG. 6B is a plan view when viewed from the upper surface 117 of the right crank 105R, and FIG. 6C is a plan view when viewed from the end on a side near the crank shaft 107 of the right crank 105R. Further, the following description will be given about the right crank 105R, and it is the same with the left crank 105L.

When the pedaling force is added from the user's foot through the pedal 103, the pedaling force is divided into a propulsion force Ft which becomes the rotational force of the crank 105 (a force in a tangential direction of rotation of the crank 105), and a loss force Fr which is a force in a normal direction of rotation of the crank 105. At this time, the right crank 105R is subjected to various deformation states such as bending deformation x, bending deformation y, tensile deformation z, and torsional deformation rz.

The bending deformation x is caused by the propulsion force Ft when the right crank 105R is deformed to be bent from the upper surface 117 toward the lower surface 118, or from the lower surface 118 toward the upper surface 117 as illustrated in FIG. 6A. In other words, the strain caused by the deformation in the rotational direction of the crank 105 (the strain in the rotational direction of the crank 105) is detected, and the strain in the rotational direction generated in the crank 105 can be detected by detecting the bending deformation x. The bending deformation y is caused by the loss force Fr when the right crank 105R is deformed to be bent from the outer surface 120 toward the inner surface 119, or from the inner surface 119 toward the outer surface 120 as illustrated in FIG. 6B. In other words, the strain caused by the deformation of the crank 105 from the outer surface 120 toward the inner surface 119, or from the inner surface 119 toward the outer surface 120 (the strain generated in a direction perpendicular to a plane containing a circuit defined by a rotational motion of the right crank 105R) is detected, and the inward/outward stain of the crank 105 can be detected by detecting the bending deformation y.

The tensile deformation z is caused by the loss force Fr in which the right crank 105R is deformed to extend or to be compressed in the longitudinal direction. In other words, the strain caused by the deformation in a direction where the crank 105 extends or is pressed in the longitudinal direction (the strain in a direction in parallel with the longitudinal direction) is detected, and the strain in the extending direction generated in the crank 105 can be detected by detecting the tensile deformation z. The torsional deformation rz is caused by the propulsion force Ft in which the right crank 105R is deformed to be distorted. In other words, the strain caused by the deformation generated in a direction to distort the crank 105 is detected, and the strain in the torsional direction generated in the crank 105 can be detected by detecting the torsional deformation rz. Further, the deformation directions of the bending deformation x, the bending deformation y, the tensile deformation z, and the torsional deformation rz are illustrated as arrows in FIGS. 6A to 6C. As described above, deformations may occur in the opposite directions to these arrows.

Therefore, any one of the bending deformation x and the torsional deformation rz may be quantitatively detected in order to measure the propulsion force Ft, and any one of the bending deformation y and the tensile deformation z may be quantitatively measured in order to measure the loss force Fr.

Herein, the description will be given about a method of detecting (measuring) the bending deformation x, the bending deformation y, the tensile deformation z, and the torsional deformation rz using the measurement module strain detection circuit 365 which is disposed as illustrated in FIG. 4 and in which the first strain gauge 369a, the second strain gauge 369b, the third strain gauge 369c, and the fourth strain gauge 369d are connected as illustrated in FIG. 5.

First, a method of detecting (measuring) of each deformation in the output A of the first detection circuit 373a will be described. The bending deformation x is caused when the right crank 105R is deformed from the upper surface 117 toward the lower surface 118 or vice versa. In a case where the right crank 105R is deformed from the upper surface 117 toward the lower surface 118, the first strain gauge 369a is compressed, and thus the resistance value is decreased. The second strain gauge 369b extends, and thus the resistance value is increased. Therefore, the output A of the first detection circuit 373a becomes a positive output (the potential Vab is high, and the potential Vr is low). In addition, in a case where the right crank 105R is deformed from the lower surface 118 toward the upper surface 117, the first strain gauge 369a extends, and thus the resistance value is increased. The second strain gauge 369b is compressed, and thus the resistance value is decreased. Therefore, the output A of the first detection circuit 373a becomes a negative output (the potential Vab is low, and the potential Vr is high).

The bending deformation y is caused when the right crank 105R is deformed from the outer surface 120 toward the inner surface 119 or vice versa. In a case where the right crank 105R is deformed from the outer surface 120 toward the inner surface 119, the first strain gauge 369a and the second strain gauge 369b are compressed together, and thus both resistance values are decreased. Therefore, the output A of the first detection circuit 373a becomes zero (there is no potential difference between the potential Vab and the potential Vr). In addition, in a case where the right crank 105R is deformed from the inner surface 119 toward the outer surface 120, the first strain gauge 369a and the second strain gauge 369b extend together, and thus both resistance values are increased. Therefore, the output A of the first detection circuit 373a becomes zero.

The tensile deformation z is caused when the right crank 105R extends or is compressed in the longitudinal direction. In a case where the right crank 105R extends, the first strain gauge 369a and the second strain gauge 369b extend together, and thus both resistance values are increased. Therefore, the output A of the first detection circuit 373a becomes zero. In addition, in a case where the right crank 105R is compressed, the first strain gauge 369a and the second strain gauge 369b are compressed together, and thus both resistance values are decreased. Therefore, the output A of the first detection circuit 373a becomes zero.

The torsional deformation rz is caused when the right crank 105R is distorted. In a case where the right crank 105R is distorted in a direction of arrow of FIG. 6B, the first strain gauge 369a and the second strain gauge 369b extend together, and thus both resistance values are increased. Therefore, the output A of the first detection circuit 373a becomes zero. In addition, in a case where the right crank 105R is distorted in the opposite direction to the arrow of FIG. 6B, the first strain gauge 369a and the second strain gauge 369b extend together, and thus both resistance values are increased. Therefore, the output A of the first detection circuit 373a becomes zero.

As described above, only the bending deformation x is detected from the output A. In other words, the first detection circuit 373a is connected to the first strain gauge 369a and the second strain gauge 369b, and detects the strain in the rotational direction which occurs in the crank 105.

Next, a method of detecting (measuring) of each deformation in the output B of the second detection circuit 373b will be described. The bending deformation x is caused when the right crank 105R is deformed from the upper surface 117 toward the lower surface 118 or vice versa. In a case where the right crank 105R is deformed from the upper surface 117 toward the lower surface 118, the third strain gauge 369c and the fourth strain gauge 369d are only bent, and no compression and extension occur in the detection direction, so that the resistance value does not change. Therefore, the output B of the second detection circuit 373b becomes zero. In addition, in a case where the right crank 105R is deformed from the lower surface 118 toward the upper surface 117, the third strain gauge 369c and the fourth strain gauge 369d are only bent, and no compression and extension occur in the detection direction, so that the resistance value does not change. Therefore, the output B of the second detection circuit 373b becomes zero.

The bending deformation y is caused when the right crank 105R is deformed from the outer surface 120 toward the inner surface 119 or vice versa. In a case where the right crank 105R is deformed from the outer surface 120 toward the inner surface 119, the third strain gauge 369c is compressed, and thus the resistance value is decreased; the fourth strain gauge 369d extends, and thus the resistance value is increased. Therefore, the output B of the second detection circuit 373b becomes the positive output (the potential Vcd is high, and the potential Vr is low). In addition, in a case where the right crank 105R is deformed from the inner surface 119 toward the outer surface 120, the third strain gauge 369c extends, and thus the resistance value is increased; the fourth strain gauge 369d is compressed, and thus the resistance value is decreased. Therefore, the output B of the second detection circuit 373b becomes the negative output (the potential Vcd is low, and the potential Vr is high).

The tensile deformation z is caused when the right crank 105R extends or is compressed in the longitudinal direction. In a case where the right crank 105R extends, the third strain gauge 369c extends, and thus the resistance value is increased; the fourth strain gauge 369d is compressed, and thus the resistance value is decreased. Therefore, the output B of the second detection circuit 373b becomes the negative output. In addition, in a case where the right crank 105R is compressed, the third strain gauge 369c is compressed, and thus the resistance value is decreased; the fourth strain gauge 369d extends, and thus the resistance value is increased. Therefore, the output B of the second detection circuit 373b becomes the positive output.

The torsional deformation rz is caused when the right crank 105R is distorted. In a case where the right crank 105R is distorted in a direction of arrow of FIG. 6B, the third strain gauge 369c extends, and thus the resistance value is increased; the fourth strain gauge 369d is deformed in the detection direction, and thus the resistance value does not change. Therefore, the output B of the second detection circuit 373b becomes the negative output. In addition, in a case where the right crank 105R is distorted in the opposite direction to the arrow of FIG. 6B, the third strain gauge 369c extends, and thus the resistance value is increased; the fourth strain gauge 369d is not deformed in the detection direction, and thus the resistance value does not change. Therefore, the output B of the second detection circuit 373b becomes the negative output.

As described above, the bending deformation y, the tensile deformation z, and the torsional deformation rz are detected from the output B. In other words, the second detection circuit 373b is connected to the third strain gauge 369c and the fourth strain gauge 369d, and detects the inward/outward strain or the extending strain which is generated in the crank 105.

Then, the propulsion force calculating unit 351a calculates the propulsion force Ft using the following Equation (1), and the loss force Fr using the following Equation (2) on the basis of the output A of the first detection circuit 373a and the output B of the second detection circuit 373b. Further, the tensile deformation z is significantly small compared to the bending deformation y, and thus can be ignored. In other words, the values calculated by Equations (1) and (2) are related to the load added to the crank 105 when the crank 105 rotates.

$$Ft = p(A-A0) + q(B-B0) [\text{kgf}] \quad (1)$$

$$Fr = s|A-A0| + u(B-B0) [\text{kgf}] \quad (2)$$

Herein, A is a value of the output A at the time when the propulsion force Ft (or the loss force Fr) is calculated, A0 is a value of the output A at the time of no load, B is a value of the output B at the time when the propulsion force Ft (or the loss force Fr) is calculated, B0 is a value of the output B at the time of no load, and p, q, s, and u are coefficients. These values are calculated by the following simultaneous equations (3) to (6).

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Herein, Am is a value of the output A when the angle of the crank 105 is inclined forward in the horizontal direction (a state where the crank 105 is horizontally extends toward the front wheel 5) and m [kg] is loaded on the pedal 103. Be is a value of the output B when the angle of the crank 105 is inclined forward in the horizontal direction and m [kg] is loaded on the pedal 103. Ae is a value of the output A when the angle of the crank 105 is inclined downward in the vertical direction (a state where the crank 105 extends vertically and toward the ground) and m [kg] is loaded on the pedal 103. Bm is a value of the output B when the angle of the crank 105 is inclined downward in the vertical direction and m [kg] is loaded on the pedal 103.

The coefficients p, q, s, u, A0, and B0 are values which can be calculated or measured, the propulsion force Ft can be calculated by substituting A and B into Equation (1), and the loss force Fr can be calculated by substituting A and B into Equation (2).

In addition, the output A is corrected in Equation (1) using the output B. The output B is corrected in Equation (2) using the output A. Therefore, it is possible to exclude an influence of the strain other than a detection target of the first detection circuit 373a and the second detection circuit 373b. Further, in a case where there is no deviation in the first strain gauge 369a and the second strain gauge 369b in the direction of the crank (the direction in parallel with the central axis C1), Ae becomes A0, and the output B does not need to be corrected.

Further, the layout of the strain gauge 369 and the configuration of the bridge circuit are not limited to those illustrated in FIGS. 4 and 5. For example, the number of strain gauges 369 is not limited to "4", and the number of bridge circuits is also not limited to "1". In other words, any combination may be configured as long as the propulsion force Ft and the loss force Fr can be calculated.

Next, the configuration of the crank rotation angle detecting sensor 2 will be described with reference to FIGS. 7 and 8.

Further, the rotation angle of the crank 105 in the following description will be presented on the basis of the right crank 105R. In other words, when the right crank 105R is located in the 12 o'clock direction (the tip faces upward), the rotation angle θ of the crank 105 is set to 0°. In addition, when the right crank 105R indicates the 3 o'clock direction (the tip faces the front side), the crank rotation angle detecting sensor 2 detects that the rotation angle of the crank 105 (hereinafter, referred to as a crank rotation angle θ) indicates 90°. When the right crank 105R indicates the 9 o'clock direction (the tip faces downward), the crank rotation angle detection sensor detects that the crank rotation angle θ indicates 270°. Then, a range of the crank rotation angle θ detected by the crank rotation angle detecting sensor 2 is 0° or more and 360° or less (0≤θ<360°, and "+" direction is defined when the right crank 105R rotates in a clockwise direction from the 12 o'clock direction.

Figure 7A:
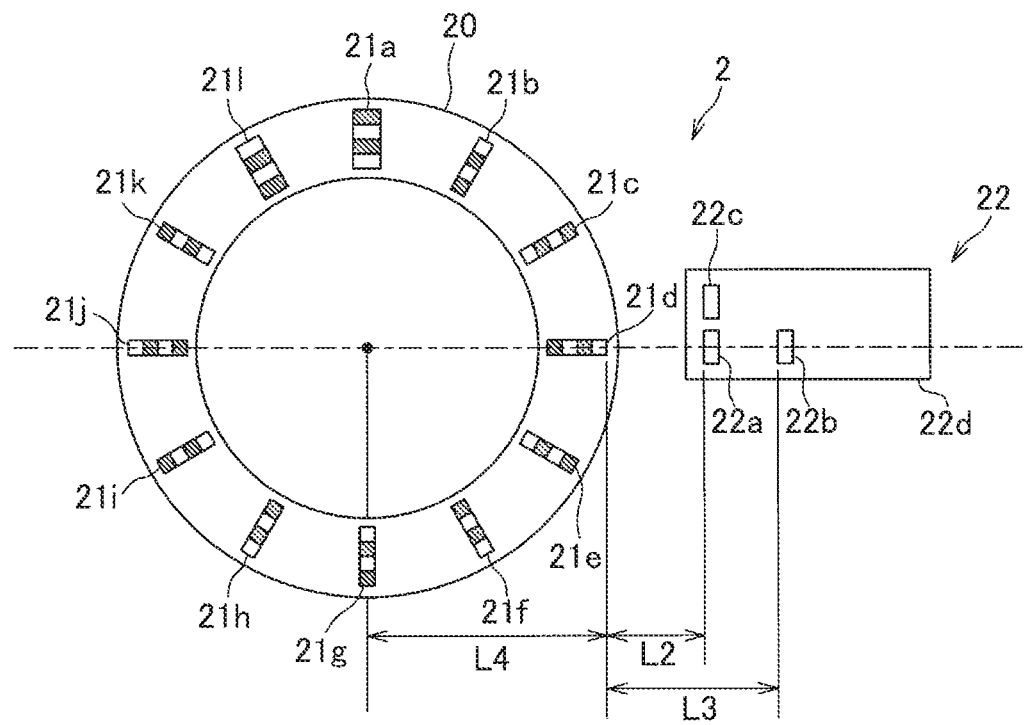
FIGS. 7A to 7C are diagrams schematically illustrating a crank rotation angle detecting sensor and a magnet.
Figure 7B:
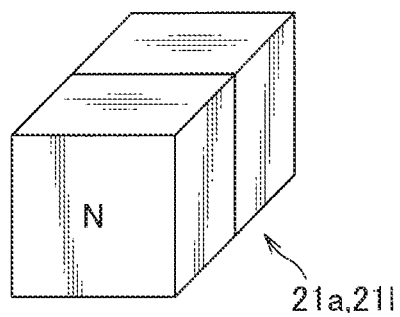
Figure 7C:
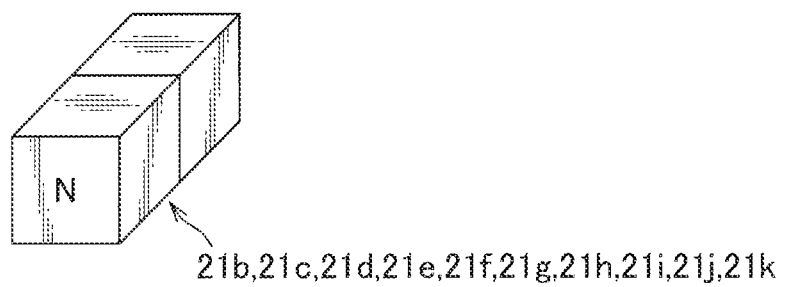
Figure 8:
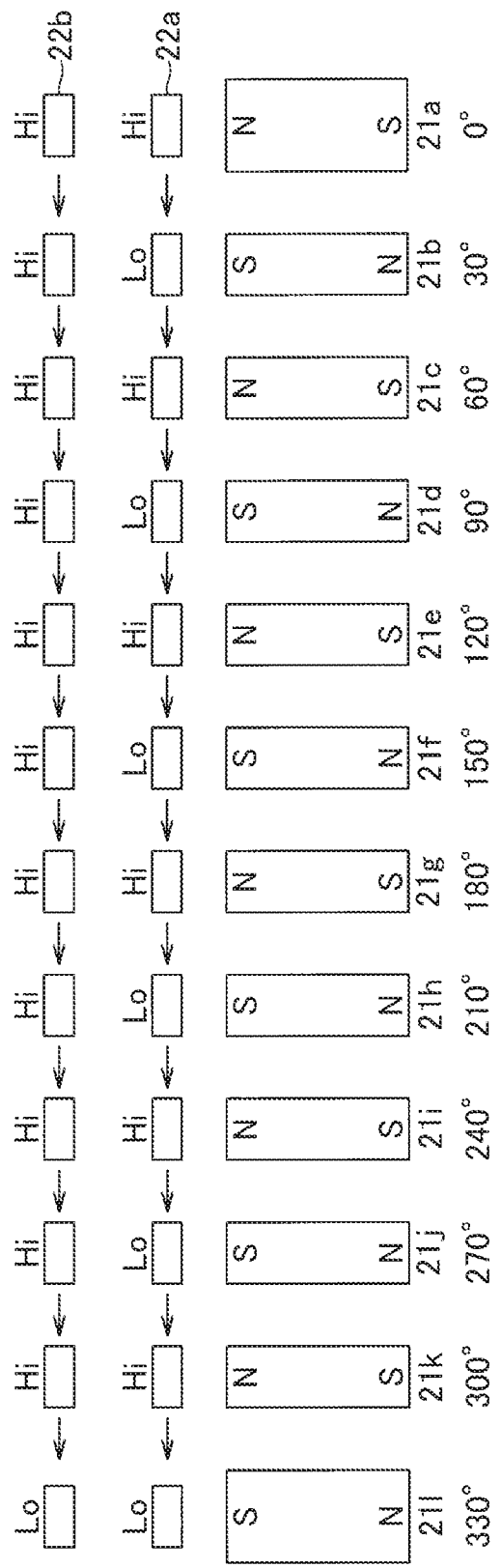
FIG. 8 is an explanatory diagram illustrating a use state of the crank rotation angle detecting sensor.

As illustrated in FIG. 7A, the crank rotation angle detecting sensor 2 is configured by an annular frame member 20, a magnetic group 21 (magnets 21a and 21b, and the like) formed of a plurality of magnets which are fixed in the surface of the frame member 20 in a predetermined interval, and the magnetic sensor 22. The frame member 20 with the magnetic group 21 fixed thereto is fixed to the side surface of the frame 3 such that the magnetic group 21 faces the crank 105 in a state where the center point of the frame member 20 and the axial center of the crank shaft 107 are matched. On the other hand, the magnetic sensor 22 is fixed to the chain ring 109, and rotates together with the crank 105 (105R).

The magnetic group 21 is configured by twelve magnets 21a to 21l which are disposed in an interval of 30° about the center point of the annular frame member 20. The magnet 21a and the magnet 21l are configured by a neodymium magnet which has significantly strong magnetic force and coercive force. Specifically, the magnets 21a and 21l are configured such that two first neodymium magnets are disposed in series (N poles of the two are piled in the same direction on the same straight line), and the other magnets 21b to 21k are configured such that two second neodymium magnets having a magnetic force smaller than the first neodymium magnet are disposed in series. In other words, the magnetic group 21 is configured by two types of magnets having different magnetic forces.

In addition, the magnet 21a and the magnet 21b are disposed in a state where the respective central axes are matched with the radial direction of the frame member 20. Then, a magnet of which the N pole faces outward and a magnet of which the N pole faces inward (center) are alternately disposed in a circumferential direction of the frame member 20. Specifically, the N poles of the magnet 21a, the magnet 21c, the magnet 21e, the magnet 21g, the magnet 21i, and the magnet 21k face outward in the radial direction (radiation direction) of the frame member 20. The N poles of the magnet 21b, the magnet 21d, the magnet 21f, the magnet 21h, the magnet 21j, and the magnet 21l face inward in the radial direction (center) of the frame member 20. Further, distances L4 from the outer tip in the radial direction to the respective magnets 21a to 21l and the center of the frame member 20 are set to be equal.

The magnetic sensor 22 is configured such that a first element 22a, the second element 22b, and a third element 22c are stored in a case 22d. The first element 22a and the second element 22b detect magnetic lines (magnetic field) in a predetermined direction (the right in the horizontal direction in FIG. 7A). In a case where the magnetic lines facing opposite to the detection direction are detected (a case where the magnet facing the N pole is detected), a Hi-level signal (hereinafter, simply referred to as Hi) is output. In a case where the magnetic lines facing the same direction as the detection direction are detected (a case where the magnet facing the S pole is detected), a Lo-level signal (hereinafter, simply referred to as Lo) is output. Further, in a case where a predetermined strength of magnetic lines is not detected, the first element 22a and the second element 22b keep the output state.

In a use state of the crank rotation angle detecting sensor 2 (a state where the frame member 20 and the magnetic sensor 22 are appropriately fixed to the bicycle 1), the first element 22a and the second element 22b are disposed outside in the radial direction of the frame member 20 (that is, at a position away from the center point of the frame member 20 compared to the magnets 21a to 21l) when viewed from the side of the bicycle 1. In addition, the detection directions of the first element 22a and the second element 22b are matched, and the center point of the frame member 20 is located on each detection direction. Then, the first element 22a is disposed at a position near the center point of the frame member 20 compared to the second element 22b, and near the outer tips of the magnet 21a to the magnet 21l which pass through on the detection direction. This is because, as to be described below, all the magnets 21a to 21l are detected using the first element 22a, and the magnet 21a showing that the crank rotation angle θ is 0° is detected using the second element 22b. Further, when the crank rotation angle θ is 0° (when the right crank 105R indicates 12 o'clock), the frame member 20 and the magnetic sensor 22 are fixed to the bicycle 1 such that the second element 22b detects the magnet 21a (the magnet 21a is located on the detection direction of the second element 22b).

In addition, the third element 22c consuming lower power than the first element 22a and the second element 22b is provided in the magnetic sensor 22. The third element 22c is provided in the vicinity of the first element 22a. When any one of the magnets 21a to 21l is detected, the system of the measurement module 301 is activated.

Next, a method of detecting the crank rotation angle of the crank rotation angle detecting sensor 2 will be described using FIG. 8. As described above, the magnets 21a to 21l are disposed in an interval of 30° about the center point in the annular frame member 20. When the crank rotation angle θ becomes 0°, the magnet 21a having the strongest magnetic force is disposed at a position where the second element 22b is detected (hereinafter, the magnet 21a may be referred to as "reference magnet 21a"). In addition, the directions of the N poles of the magnet 21a to the magnet 21l are alternately switched. Therefore, when the magnetic sensor 22 fixed to the chain ring 109 rotates about the center of the crankshaft 107 as the crank 105 rotates, the first element 22a of the magnetic sensor 22 is switched to Hi or Lo whenever passing by front of the magnets 21a to 21l. Similarly, the second element 22b of the magnetic sensor 22 switches the output between Hi and Lo whenever passing by in front of the magnets 21a and 21l. "Hi" or "Lo" output from the first element 22a indicates that the rotation of the crank 105 rotates by 30° (hereinafter, referred to as "gap angle detection signal"). On the other hand, "Hi" output from the second element 22b indicates that the crank rotation angle θ=0° is detected (hereinafter, referred to as "reference angle detection signal").

In this way, the crank rotation angle θ can be detected from 0° in an interval of 30° by using the gap angle detection signal and the reference angle detection signal. Further, Hi output from the second element 22b becomes Lo when the second element 22b passes by the magnet 21l which is reversely disposed with the same magnetic force. In other words, resetting is performed. Therefore, the crank rotation angle θ can be detected continuously. Hereinafter, "Lo" output from the second element 22b will be called "reset signal".

In addition, when the first element 22a and the reference magnet 21a are separated farthest away from each other, the following three conditions are desirably satisfied in order to prevent that the first element 22a detects the reference magnet 21a. (1) When the reference magnet 21a is located closest to the second element 22b on the detection direction (hereinafter, referred to as "second detection direction") of the second element 22b, the second element 22b is able to detect the reference magnet 21a. (2) When the magnets 21b to 21l having the smallest magnetic force are located closest to the first element 22*a* on the detection direction of the first element 22*a* (hereinafter, referred to as "first detection direction"), the first element 22*a* is able to detect the magnets 21*b* to 21*k*. (3) When the reference magnet 21*a* is separated farthest away from the first element 22*a* on the first detection direction, the first element 22*a* is able to detect the reference magnet 21*a*.

Next, a block configuration of the cycle computer 201 will be described. The cycle computer 201 includes the cycle computer display unit 203, the cycle computer operating unit 205, the cycle computer wireless receiving unit 209, a cycle computer external communication unit 210, a cycle computer storage unit 253, and a cycle computer control unit 251 as illustrated in FIG. 3.

The cycle computer display unit 203 displays various types of information on the basis of an instruction of the user (driver). In this embodiment, the propulsion force Ft and the loss force Fr are visualized. Further, any method may be employed for visualization, and for example the propulsion force Ft and the loss force Fr may be displayed using vectors at every rotation angle of 30° of the crank 105 on the basis of the crank rotation angle θ transmitted from the measurement module 301. In addition, there may be employed graph display, different color display, symbol display, and three-dimensional display as another method for example. In addition, a combination of these methods may be employed.

The cycle computer operating unit 205 receives a user's instruction (input). For example, the cycle computer operating unit 205 receives an instruction of displaying content in the cycle computer display unit 203 from the user.

The cycle computer wireless receiving unit 209 receives transmission data (the propulsion force Ft and the loss force Fr, and the rotation angle and the cadence of the crank 105) transmitted from the measurement module 301.

The cycle computer external communication unit 210 mainly transmits the propulsion force Ft, the loss force Fr, and the crank rotation angle θ stored in the cycle computer storage unit 253 to an external computer of the cycle computer 201.

Various types of information are stored in the cycle computer storage unit 253. Various types of information include, for example, the control program of the cycle computer control unit 251 and temporary information which is necessary when the cycle computer control unit 251 performs the control. Further, the cycle computer storage unit 253 includes a RAM (Random Access Memory), a ROM (Read Only Memory), and a nonvolatile readable/writable memory such as a flash memory. The ROM stores the control program and various types of parameters and constants necessary for converting the propulsion force Ft and the loss force Fr into data which is visually displayed in the cycle computer display unit 203.

The RAM stores temporary information necessary when the cycle computer control unit 251 performs the control. The nonvolatile readable/writable memory stores the propulsion force Ft, the loss force Fr, and the crank rotation angle θ in association with each other.

The cycle computer control unit 251 comprehensively controls the cycle computer 201. Further, the measurement module 301 may be comprehensively controlled. In addition, the cycle computer control unit 251 converts the propulsion force Ft and the loss force Fr into data which is visually displayed in the cycle computer display unit 203.

In the measurement module 301 and the cycle computer 201 having the configuration described above, the measurement module 301 measures the propulsion force Ft and the loss force Fr at every 30° of the rotation angle of the crank 105, and transmits the propulsion force Ft, the loss force Fr, and the crank rotation angle θ to the cycle computer 201. In the cycle computer 201, the propulsion force Ft, the loss force Fr, and the crank rotation angle θ transmitted from the measurement module 301 are displayed in the cycle computer display unit 203, and stored and accumulated in the cycle computer storage unit 253.

Then, for example after running is over, the cycle computer 201 transmits the propulsion force Ft, the loss force Fr, and the crank rotation angle θ accumulated in the cycle computer storage unit 253 from the cycle computer external communication unit 210 to a server 401 described below. Further, a transmission timing for the data is not limited to the period after running is over may be a period during running, or may be at any time.

Next, the description will be given with reference to FIGS. 9 to 12 about the riding posture outputting device which determines whether the user is dancing or sitting on the basis of the propulsion force Ft, the loss force Fr, and the crank rotation angle θ accumulated in the cycle computer 201 as described above.

Figure 9:
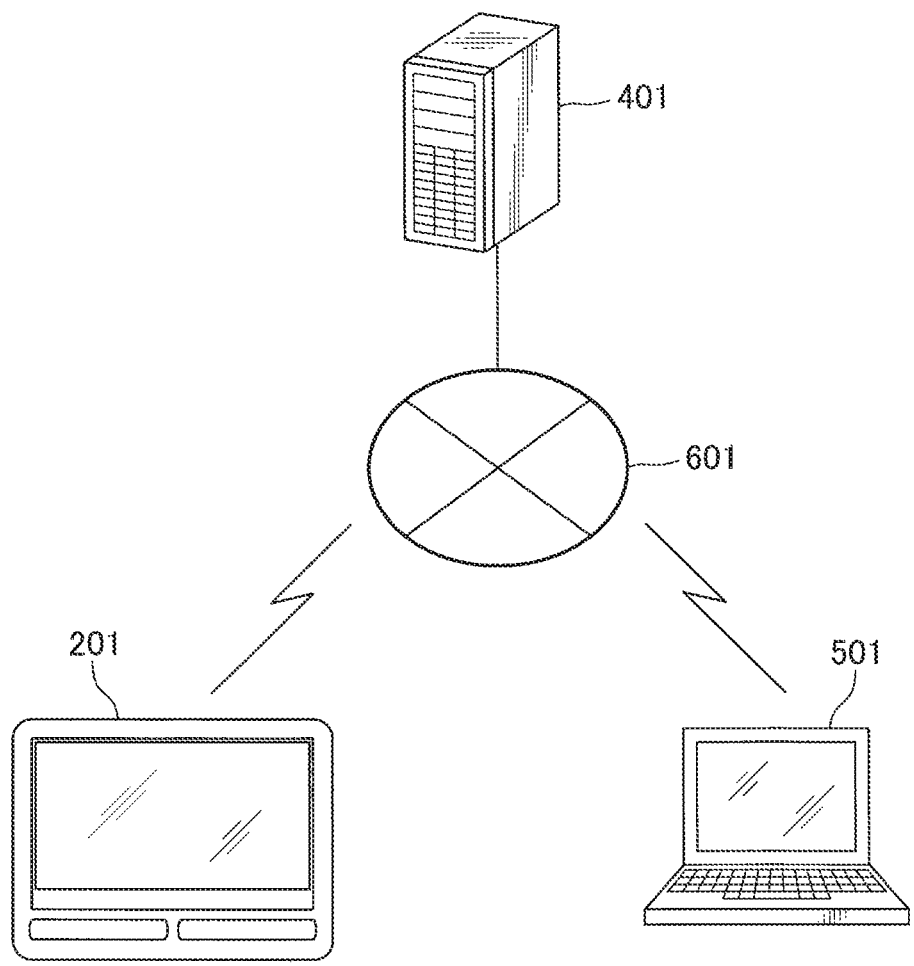
FIG. 9 is a diagram illustrating a network configuration in which the cycle computer and a server are contained.

FIG. 9 is a diagram illustrating a configuration of a network of the server 401 and the cycle computer 201 according to this embodiment.

The server 401 is a computer installed in an office, and in this embodiment it is determined whether the driver is dancing or sitting on the basis of the propulsion force Ft, the loss force Fr, and the crank rotation angle θ input from the cycle computer 201 through the Internet 601. In other words, it is determined whether the driver pedals out of the saddle. Further, while only one cycle computer 201 is illustrated in FIG. 9, it is a matter of course that there may be a plurality of cycle computers.

Figure 10:
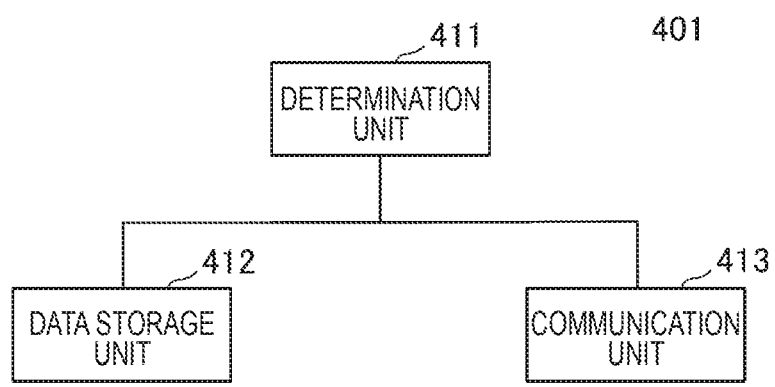
FIG. 10 is a diagram illustrating a functional configuration of the server.

Since the server 401 is a computer as described above, there are included a CPU (Central Processing Unit), a RAM, a ROM, a hard disk drive, and a network interface as it is well known. FIG. 10 is a diagram illustrating a functional configuration when the server 401 serves as the riding posture outputting device. The server is provided with a determination unit 411, a data storage unit 412, and a communication unit 413.

The determination unit 411 as the output unit determines whether the driver is dancing or sitting on the basis of the propulsion force Ft, the loss force Fr, and the crank rotation angle θ which are received from the cycle computer 201, and outputs a determination result to the data storage unit 412 or the communication unit 413. In other words, the propulsion force Ft and the loss force Fr correspond to the force information related to the force applied to the crank 105, and the crank rotation angle θ corresponds to the angle information related to the rotation angle of the crank 105. A determination method will be described below. A computer program which is executed on the CPU may function as the determination unit 411.

The data storage unit 412 accumulates the propulsion force Ft, the loss force Fr, and the crank rotation angle θ which are received from the cycle computer 201. The hard disk drive may function as the data storage unit 412.

The communication unit 413 receives the propulsion force Ft, the loss force Fr, and the crank rotation angle θ from the cycle computer 201, and transmits the determination result in the determination unit 411. Further, the destination to which the determination result is transmitted is not limited to the cycle computer 201, and may be a computer 501 belonging to the user for example. The network interface serves as the communication unit 413.

Figure 11:
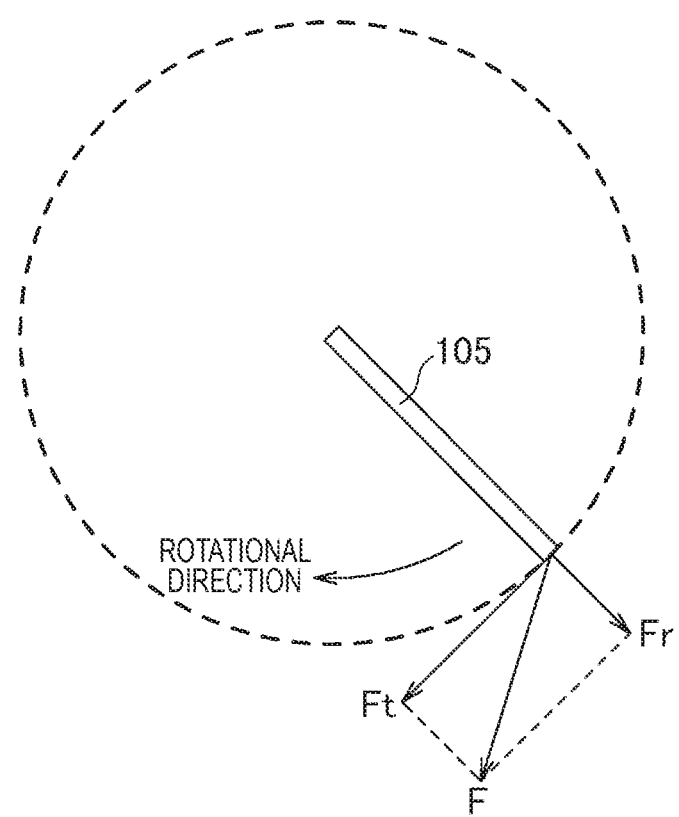
FIG. 11 is an explanatory diagram of a force applied to the crank.

Next, the determination method of the riding posture performed by the determination unit 411 will be described. The propulsion force Ft and the loss force Fr received from the cycle computer 201 include a force component in the tangential direction of rotation of the crank 105 and a force component in the normal direction as illustrated in FIG. 11. Then, a synthesized force of these two components is added to the crank 105 as a load F.

The load F becomes the maximum value when the crank 105 is near a 3 o'clock position in the case of the sitting, and a weight is applied on the pedal 103 in the case of the dancing. Therefore, the load F becomes the maximum value (the maximum value of the magnitude of force or the component) at the bottom dead center (the position of the crank 105 is near 5 to 6 o'clock).

Even if the weight is applied to the pedal 103 when the crank 105 is at a position of 3 o'clock (the ground rotation angle=90°) in the case of the dancing, sometimes the weight is shifted side to side. Therefore, the crank rotation angle θ when the applying weight is at its peak is delayed by 90°. Therefore, the crank rotation angle θ at which the load F is maximized becomes 90° or more. With this regard, since the body does not swing side to side in the case of the sitting, the load F is maximized when the crank rotation angle θ is near at 90°.

Therefore, the load F is calculated from the propulsion force Ft and the loss force Fr, and the crank rotation angle θ at which the load F is maximized is detected, so that it is possible to determine whether the driver is dancing or sitting. In other words, the riding posture of the man-powered machine (the bicycle 1) is determined on the basis of the angle information (the crank rotation angle θ) when the force information (the load F) is maximized (predetermined state). In addition, in this embodiment, since the load F is calculated from the propulsion force Ft and the loss force Fr, the determination unit 411 also serves as the acquisition unit which acquires the force information on the force applied to the crank 105.

As described above, in the case of the dancing, the force information is maximized when the position of the crank 105 is near 5 to 6 o'clock (the crank rotation angle θ is between 150° to 180°). Therefore, assuming that the position of 4:30 (the crank rotation angle θ=135°) of the crank 105 is set as a threshold for example, in a case where the maximized crank rotation angle θ is equal to or more than the threshold, it may be determined that the driver is dancing. In other words, the riding posture is determined on the basis of a predetermined threshold which is set with respect to the rotation angle of the crank 105.

In addition, a period of determining the maximum value may be not limited to one rotation of the crank 105, but be determined at a plurality of times. Alternatively, a predetermined range of angle containing the threshold within one rotation may be employed. For example, in a case where the threshold is provided at the position of 4:30 of the crank 105, a range of 2 to 7 o'clock positions (the crank rotation angle θ is between 60° to 210°) of the crank 105 is the period of determining the maximum value.

In addition, the maximum value may be a maximum value among the loads F at every 30° calculated from the data accumulated in the data storage unit 412, or may be an estimated value obtained by interpolating the values at every 30°. For example, in a case where the load F tends to increase when the position of the crank 105 is between 4 to 5 o'clock, and the load F tends to decrease when the position is between 5 to 6 o'clock, the maximum value may be 5 o'clock (the crank rotation angle θ=150°), and the maximum value may be an increase rate when the position of the crank 105 is between 4 to 5 o'clock and a decrease rate when the position is between 5 to 6 o'clock.

In addition, in a case where the values of the 5 and 6 o'clock positions of the crank 105 are almost the same, the middle (the position of the crank 105 is at 5:30, and the crank rotation angle θ=165°) may be estimated as the maximum value. Alternatively, the variation at every angle of force (load F) is expressed as a curve, and the center value of a width obtained by cutting the curve at a predetermined threshold (for example, 50%) may be estimated as the crank rotation angle θ corresponding to the "maximum value".

Further, the upper portion (a portion surrounded by the curve and the threshold) when the curve is cut by the predetermined threshold (for example 50%) is integrated, and the angle to be a gravity center may be set to the crank rotation angle θ corresponding to the "maximum value".

In other words, the maximum value may be calculated from the value of the acquired load F. The case of this embodiment is particularly effective because an error with respect to an actual maximum value becomes large when the determination is performed based only on an acquisition value since an acquisition interval of the load F is 30°.

Figure 12:
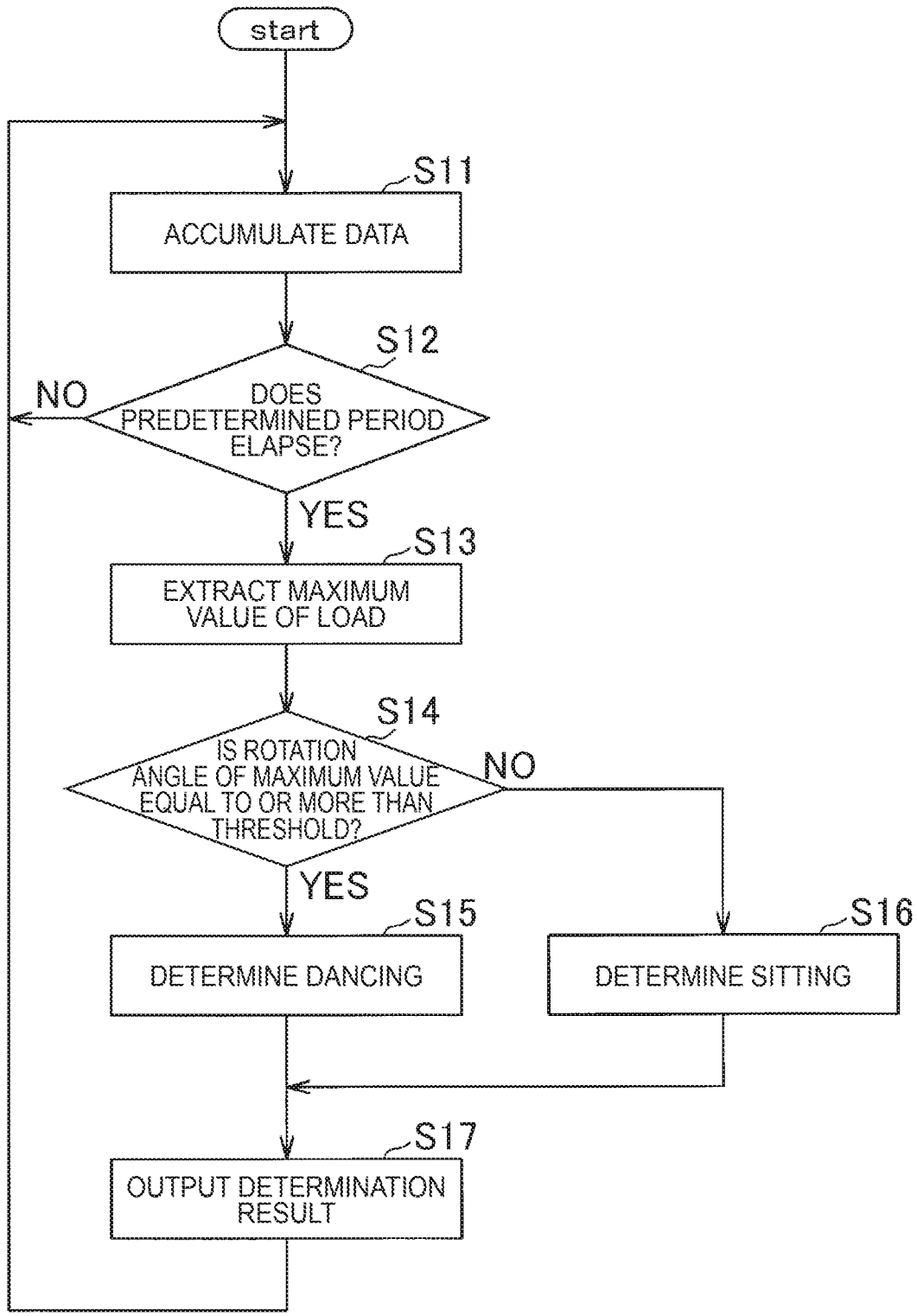
FIG. 12 is a flowchart of a riding posture outputting method in the server illustrated in FIG. 10.

FIG. 12 is a flowchart of the riding posture outputting method. The flowchart is performed by the determination unit 411. In other words, the flowchart of FIG. 12 is configured as a computer program. First, the data (the propulsion force Ft, the loss force Fr, and the crank rotation angle θ) received from the cycle computer 201 is acquired and stored in the data storage unit 412 (Step S11). Further, the load F may be calculated and stored at the time of Step S11. In other words, Step S11 serves as the acquisition process.

Next, it is determined whether a predetermined period of determining the riding posture (for example, the crank 105 rotates once) elapses (Step S12). In a case where the predetermined period does not elapse (NO), the procedure returns to Step S11.

In a case where the predetermined period elapses in Step S12 (YES), a maximum value of the load F in this period is extracted (Step S13). Next, it is determined whether the crank rotation angle θ of the extracted maximum value of the load F is equal to or more than a threshold (Step S14). In a case where the crank rotation angle is equal to or more than the threshold (YES), it is determined that the driver is dancing (Step S15).

On the other hand, in a case where it is determined that the crank rotation angle is less than the threshold in Step S14 (NO), it is determined that the driver is sitting (Step S16).

Then, a result determined in Step S15 or S16 (determination result) is output to the data storage unit 412 and the communication unit 413 (Step S17). The communication unit 413 outputs the determination result to the cycle computer 201 and the computer 501. Further, the determination result may be stored in the data storage unit 412, and may be output according to a request from the computer 501. In other words, Steps S13 to S17 serve as the output process.

Further, the determination result is not limited to that only the riding posture is output, and may be added to data obtained by analyzing a variation of the propulsion force Ft and the loss force Fr. For example, the dancing and the sitting may be displayed in a graph of a variation with respect to time series of the propulsion force Ft and the loss force Fr, and a running distance, or sections of the dancing and the sitting may be changed in color. Alternatively, the determination result may be output as a ratio of the dancing in a certain section.

According to this embodiment, the communication unit 413 acquires the crank rotation angle θ of the bicycle 1 and the propulsion force Ft and the loss force Fr which are added to the crank 105 in the crank rotation angle θ. Then, the determination unit 411 determines whether the driver is dancing on the basis of the crank rotation angle θ when the load F calculated from the propulsion force Ft and the loss force Fr is maximized and outputs the determination result. In this way, it is determined whether the driver is dancing on the basis of the crank rotation angle θ, the propulsion force Ft, and the loss force Fr. Therefore, there is no need to take account of the posture of the bicycle itself unlike a case where the posture is determined on the basis of the gyro sensor, it is possible to determine whether the driver is dancing with good accuracy.

In addition, since the dancing is determined on the basis of the threshold which is set with respect to the crank rotation angle θ, it is possible to easily determine whether the driver is dancing only by comparing with the threshold.

In addition, a period of determining the maximum value of the load F may be within a predetermined angular range including the threshold. In this case, the dancing may be determined on the basis of the crank rotation angle θ and the load F only in the vicinity of the threshold with which the dancing is determined. Therefore, it is possible to reduce a capacity of memory for storing the crank rotation angle θ and the load F.

In addition, the period of determining the maximum value of the load F may be within a period when the crank 105 rotates n times (n is a natural number of 1 or more). In this case, the determination may be performed on the basis of the crank rotation angle θ and the load F when the crank 105 rotates one or more times. Therefore, since the analysis can be made on the basis of a lot of information, it is possible to make a determination with more accuracy.

Further, the above-described embodiment has been described about an example in which the dancing is determined by the right crank 105R, and the left crank 105L may be used. In this case, the configurations are the same except that the crank rotation angle θ (the position of the crank 105) is detected in the counterclockwise direction of the crank. Further, the determination may be performed on the basis of the detection results of both cranks 105. For example, as a method of using the detection results of both cranks 105, there is a method of setting one of the right and left cranks of which the maximum value is larger as a determination target.

In addition, the threshold may be changed according to a magnitude of the load F. In a case where the load F is smaller than a predetermined value (a case where the bending force is weak), an influence of the weight of feet becomes larger even when the driver is sitting. Therefore, since a maximum value of the load is near 5 to 6 o'clock, the threshold is changed to approach from 4:30 to 5 o'clock for example. Alternatively, in a case where the load F is reduced still more than a value to change the threshold, the dancing may be not determined (it is determined that the driver is always sitting, or information indicating no determination is output). Further, a force for determining to change the threshold is not limited to the load F, and other values such as torque may be used. In other words, it may be detected that the bending force is weak lesser than a certain reference value.

In addition, in the above-described embodiment, the load F is calculated from the propulsion force Ft and the loss force Fr, and a sensor may be used to directly detect the load F.

Second Embodiment

Next, a riding posture outputting device according to a second embodiment of the invention will be described with reference to FIGS. 13A and 13B. Further, the same portions as those in the first embodiment will be denoted with the same symbols, and the descriptions of the same symbols will be omitted.

In this embodiment, the configurations of the measurement module 301, the cycle computer 201, and the server 401 are the same as those of the first embodiment, but the method of determining the dancing or sitting is different.

Figure 13A:
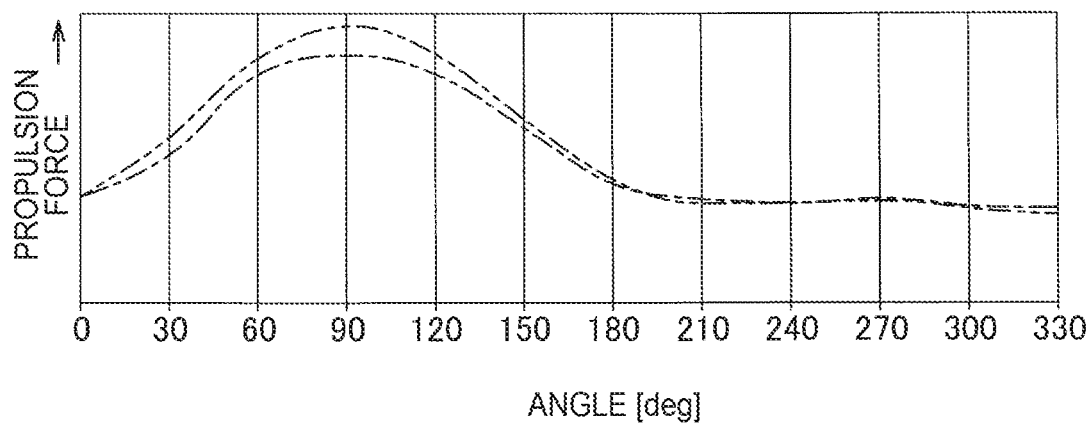
FIGS. 13A and 13B are graphs illustrating a variation with respect to a tangential direction of rotation of the crank (that is, a crank rotation angle of a propulsion force) in a riding posture outputting device according to a second embodiment of the invention.
Figure 13B:
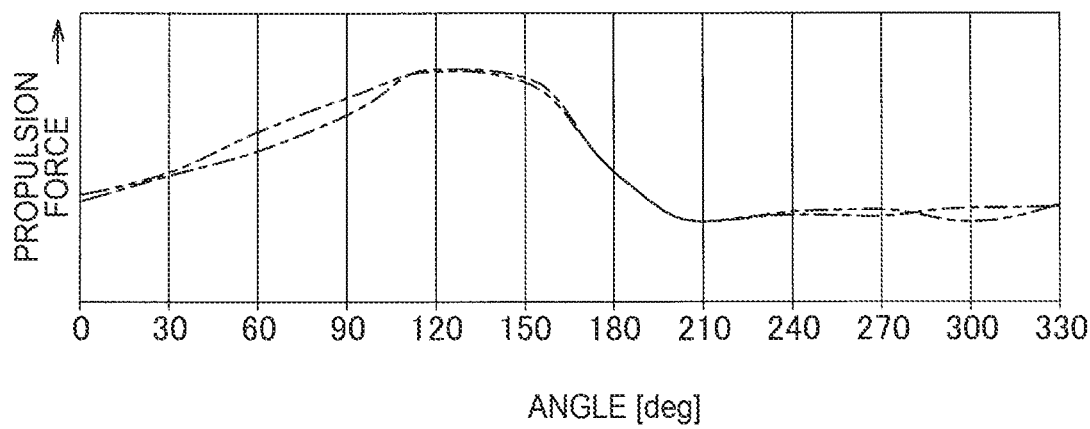

FIGS. 13A and 13B illustrate graphs of a variation with respect to the tangential direction of rotation of the crank 105 (that is, the crank rotation angle θ of the propulsion force Ft). A chain line in the drawing indicates the crank 105L on the left side, and a two-dotted chain line indicates the crank 105R on the right side. In addition, FIG. 13A illustrates the sitting, and FIG. 13B illustrates the dancing. As illustrated in FIGS. 13A and 13B, the crank rotation angle θ at which the propulsion force Ft is maximized is different in the sitting and the dancing. In the case of the sitting of FIG. 13A, the vicinity of 90° (the position of the crank 105 is 3 o'clock) is maximized. In the case of the dancing of FIG. 13B, the vicinity of 120° to 150° (the position of the crank 105 is within 4 to 5 o'clock) is maximized.

This is because, similarly to the first embodiment, a peak crank rotation angle θ applied with the weight is delayed by 90° since the right and left loads of the weight takes time in moving the load in the case of the dancing even when the weight is applied to the pedal 103 when the crank 105 is at a 3 o'clock position (the crank rotation angle θ=90°). Therefore, the crank rotation angle θ at which the load F is maximized becomes 90° or more. With this regard, since the body does not swing side to side in the case of the sitting, the load F is maximized when the crank rotation angle θ is near at 90°.

Therefore, it is possible to determine whether the driver is dancing or sitting by detecting the crank rotation angle θ at which the propulsion force Ft is maximized. In other words, the riding posture of the driver of the man-powered machine (the bicycle 1) is determined on the basis of the angle information when the component of the force (the propulsion force Ft) in the rotational direction of the crank 105 is maximized (predetermined state) among the weights added to the crank 105.

As described above, the crank rotation angle θ is maximized when the position of the crank 105 is near 4 to 5 o'clock in the case of the dancing for example. Therefore, it may be determined that the driver is dancing in a case where the crank rotation angle θ is equal to or more than the threshold when the position of the crank 105 is 4 o'clock (the crank rotation angle θ=120°).

The flowchart is basically the same as that of FIG. 12 except that the force for the determination is not the load F but changed to the propulsion force Ft.

According to this embodiment, the determination unit 411 determines whether the driver is dancing on the basis of the crank rotation angle θ when the propulsion force Ft is maximized. In this way, the dancing can be determined on the basis of the crank rotation angle θ and the propulsion force Ft. In other words, the dancing can be determined on the basis of a maximum value of the component of the force in the rotational direction of the crank 105.

In addition, since the loss force Fr is not necessary, and the data amount to be received by the server 401 can be reduced compared to the first embodiment, a communication capacity and a capacity of the hard disk drive and the memory can be saved.

Further, even in this embodiment, the period of determining the maximum value may be not limited to one rotation of the crank 105, but be determined at a plurality of times. Alternatively, the period may be a predetermined range of angle containing the threshold within one rotation. In addition, the maximum value may be a maximum value among the propulsion forces Ft at every 30° calculated from the data accumulated in the data storage unit 412, or as described in the first embodiment may be an estimated value obtained by interpolating the values at every 30°.

In addition, the threshold may be changed according to the magnitude of the loss force Fr similarly to the first embodiment. For example, the threshold is changed to approach from 4 to 5 o'clock. Alternatively, in a case where the load F is reduced still more than a value to change the threshold, the dancing may be not determined (it is determined that the driver is always sitting, or information indicating no determination is output).

Further, it is a matter of course that the dancing may be determined by any one of the right crank 105R and the left crank 105L, and may also be determined on the basis of the detection results of both cranks 105.

Third Embodiment

Next, a riding posture outputting device according to a third embodiment of the invention will be described with reference to FIGS. 14 and 15. Further, the same portions as those in the first embodiment will be denoted with the same symbols, and the descriptions of the same symbols will be omitted.

In this embodiment, the configurations of the measurement module 301, the cycle computer 201, and the server 401 are the same as those of the first embodiment, but the method of determining the dancing or sitting is different.

Figure 14A:
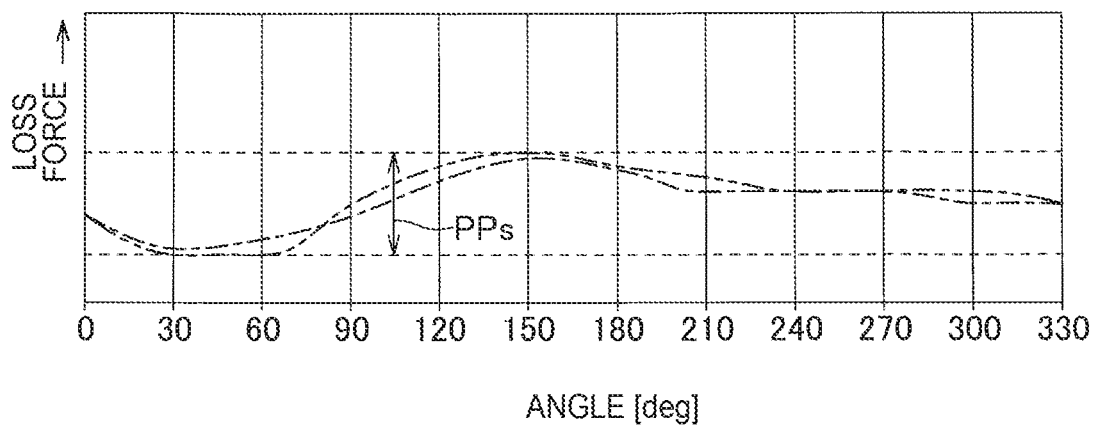
FIGS. 14A and 14B are graphs illustrating a variation with respect to a normal direction of rotation of the crank (that is, a crank rotation angle of a loss force) in the riding posture outputting device according to a third embodiment of the invention.
Figure 14B:
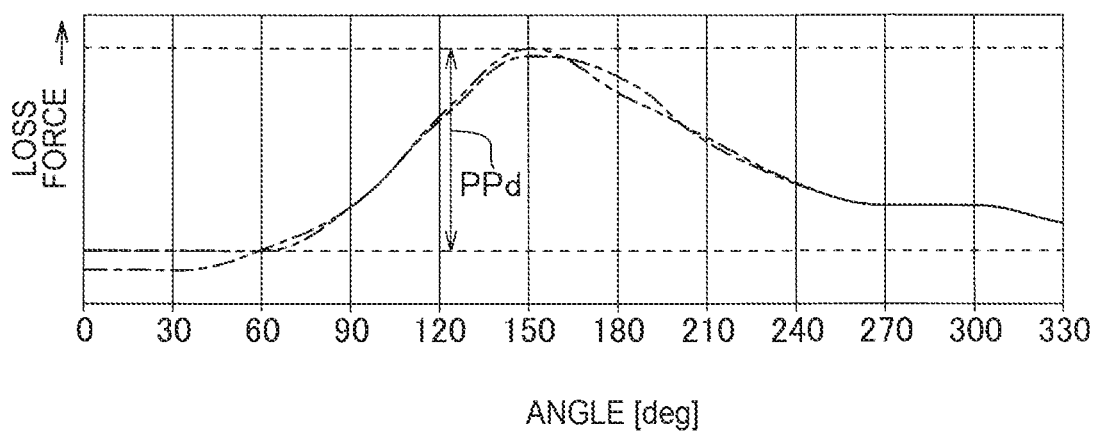

FIGS. 14A and 14B illustrate graphs of a variation with respect to the normal direction of rotation of the crank 105 (that is, the crank rotation angle θ of the loss force Fr). A chain line in the drawing indicates the crank 105L on the left side, and a two-dotted chain line indicates the crank 105R on the right side. In addition, FIG. 14A illustrates the sitting, and FIG. 14B illustrates the dancing. As illustrated in FIGS. 14A and 14B, the crank rotation angle θ at which differential value (PPs of FIG. 14A and PPd of FIG. 14B) between a maximum value and a minimum value of the loss force Fr is different in the sitting and the dancing.

This is because, in the case of the dancing, the weight is applied in the normal direction of the crank 105 on the 3 to 6 o'clock position of the crank 105 (90° to 180° of the crank rotation angle θ) due to the user's weight, and the loss force Fr in the normal direction of the crank 105 is larger than that in the case of the sitting.

Therefore, it can be determined whether the driver is dancing or sitting when a detected differential value between a maximum value and a minimum value of the loss force Fr (a width from a maximum value to a minimum value) is equal to or more than a certain value. In other words, the loss force Fr corresponds to the component of the force in the longitudinal direction of the crank 105 among the weights added to the crank 105, and the differential value between a maximum value and a minimum value corresponds to a change in the component of the force in the longitudinal direction. Therefore, in this embodiment, the riding posture is determined on the basis of the change in the component of the force in the longitudinal direction of the crank 105 among the weights added to the crank 105.

In a case where the above-described certain value is set to the threshold and the differential value is equal to or more than the threshold, it may be determined that the driver is dancing. The threshold may be obtained by an experiment or a simulation. In addition, the threshold may be appropriately adjusted according to the user's weight and the pedaling force. Alternatively, the weight information of the user may be acquired from the cycle computer 201 or the computer 501. For example, the threshold may be determined on the basis of about 60% of the weight. In other words, the threshold may be set in consideration of the weight at the time of the dancing.

Figure 15:
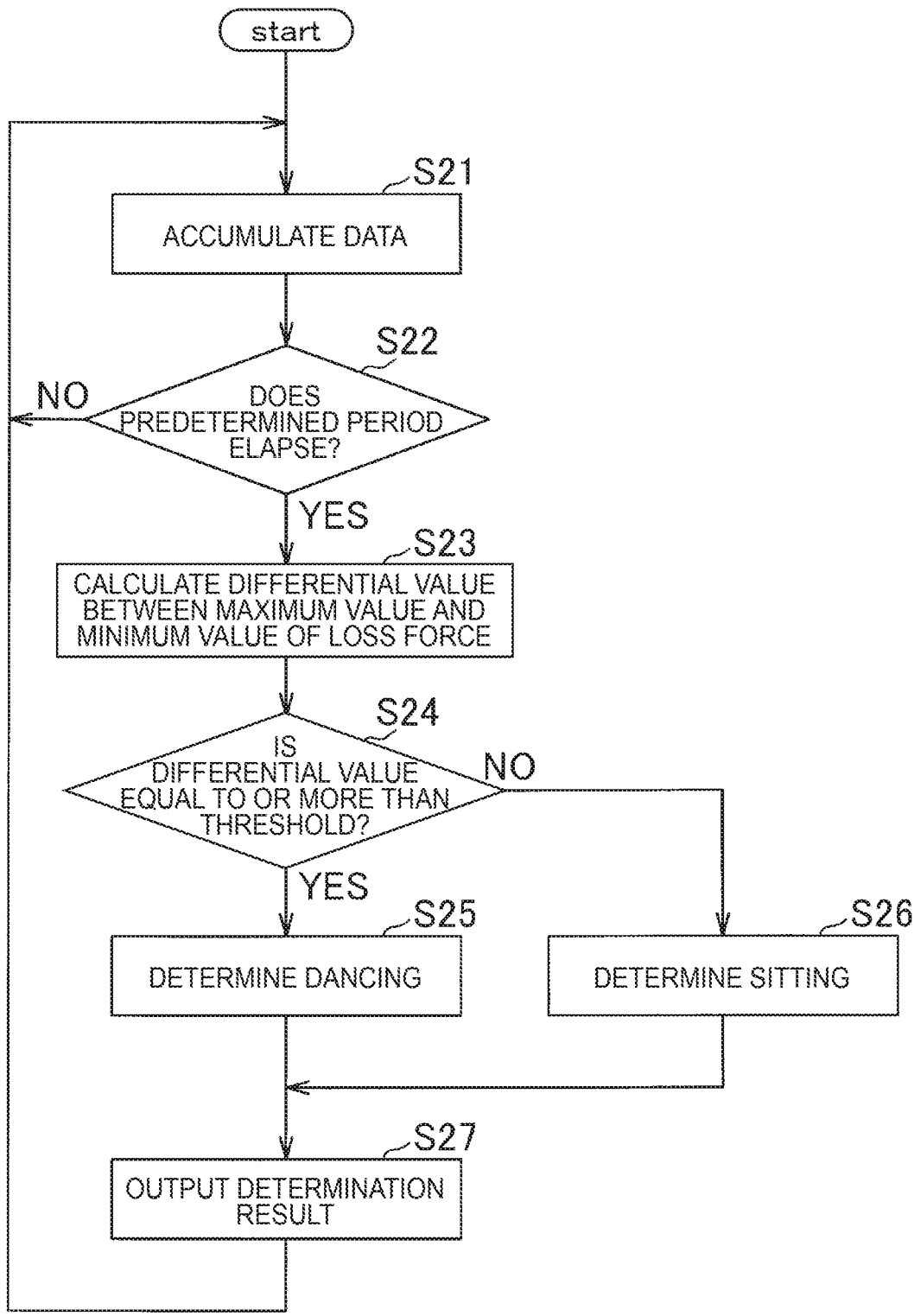
FIG. 15 is a flowchart of the riding posture outputting method in the riding posture outputting device according to the third embodiment of the invention.

FIG. 15 illustrates a flowchart of the riding posture outputting method according to this embodiment. The flowchart is performed by the determination unit 411. First, the data (the loss force Fr) received from the cycle computer 201 is acquired and stored in the data storage unit 412 (Step S21). Next, it is determined whether a predetermined period of determining the riding posture (for example, the crank 105 rotates once) elapses (Step S22). In a case where the predetermined period does not elapse (NO), the procedure returns to Step S21.

In a case where the predetermined period elapses in Step S22 (YES), the differential value between the maximum value and the minimum value of the loss force Ft in this period is extracted (Step S23). Next, it is determined whether the calculated differential value is equal to or more than a threshold (Step S24). In a case where the differential value is equal to or more than the threshold (YES), it is determined that the driver is dancing (Step S25).

On the other hand, in a case where it is determined that the crank rotation angle is less than the threshold in Step S24 (NO), it is determined that the driver is sitting (Step S26).

Then, a result determined in Step S25 or S26 (determination result) is output from the communication unit 413 (Step S27). Further, the determination result may be stored in the data storage unit 412, and may be output according to a request from the computer 501.

According to this embodiment, there are provided with the acquisition unit (the communication unit 413) which acquires the information on the component of the force (the loss force Fr) in the longitudinal direction of the crank 105 among the forces applied on the crank 105 of the bicycle 1, and the output unit (the determination unit 411) which outputs information on the riding posture of the driver of the bicycle 1 on the basis of the change in the loss force Fr in the predetermined period. In this way, the dancing may be determined on the basis of the loss force Fr added to the crank 105. In other words, the dancing may be determined on the basis of the difference between the maximum value and the minimum value of the component of the force in the longitudinal direction of the crank 105.

In addition, since the crank rotation angle θ is not necessary, and the data amount to be received by the server 401 can be reduced, a communication capacity and a capacity of the hard disk drive and the memory can be saved.

Further, even in this embodiment, the period of determining the maximum value may be not limited to one rotation of the crank 105, but be determined at a plurality of times. Alternatively, the period may be a predetermined range of angle containing the threshold within one rotation. For example, when the position of the crank is set to a range of 2 to 7 o'clock (the crank rotation angle θ is 60° to 210°), it is possible to include a section where the weight is applied in the normal direction of the crank 105.

In addition, the differential value may be a value calculated from the maximum value and the minimum value of the loss force Fr at every 30° calculated from the data accumulated in the data storage unit 412, or may be calculated from an estimated maximum value and an estimated minimum value through interpolation of the values at every 30° as described in the first embodiment.

Further, it is a matter of course that the dancing may be determined by any one of the right crank 105R and the left crank 105L, and may also be determined on the basis of the detection results of both cranks 105. For example, as a method of using the detection results of both cranks 105, there is a method of setting one of the right and left differential values of which the maximum value is larger as a determination target.

Fourth Embodiment

Next, a riding posture outputting device according to a fourth embodiment of the invention will be described with reference to FIGS. 16 and 17. Further, the same portions as those in the first embodiment will be denoted with the same symbols, and the descriptions of the same symbols will be omitted.

In this embodiment, the configurations of the measurement module 301, the cycle computer 201, and the server 401 are the same as those of the first embodiment, but the method of determining the dancing or sitting is different.

Figure 16A:
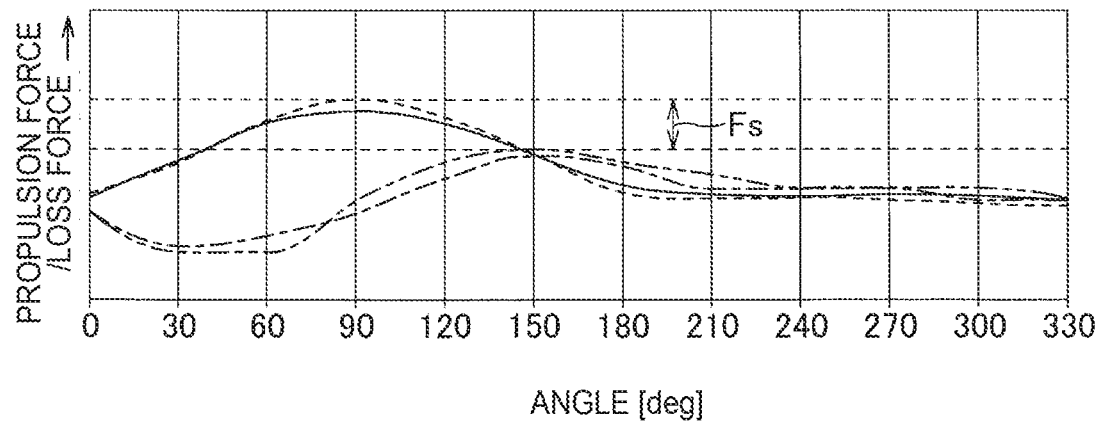
FIGS. 16A and 16B are graphs illustrating a variation with respect to the crank rotation angles of the propulsion force and the loss force in the riding posture outputting device according to a fourth embodiment of the invention.
Figure 16B:
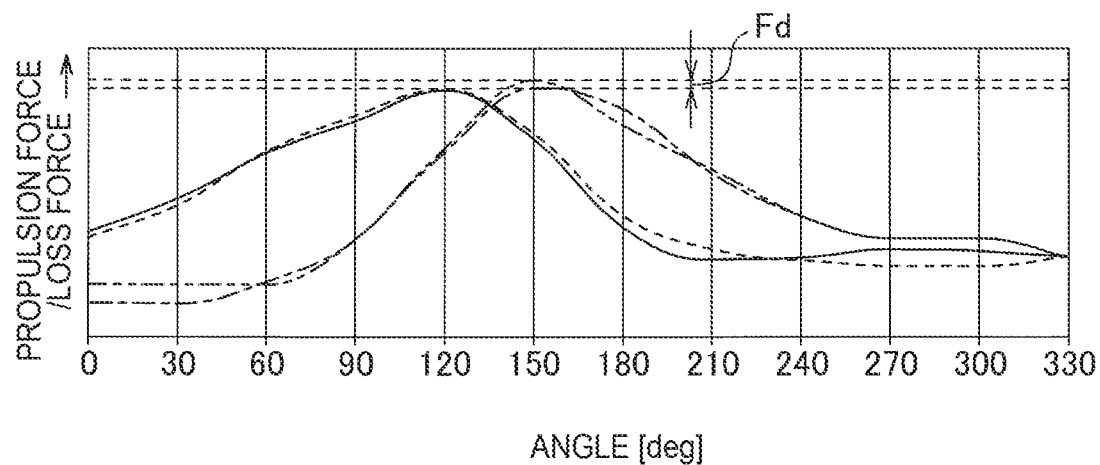

FIGS. 16A and 16B illustrate graphs of a variation with respect to the tangential direction and the normal direction of rotation of the crank 105 (that is, the crank rotation angle θ of the propulsion force Ft and the loss force Fr). The solid line in the drawing represents the propulsion force Ft of the left crank 105L, the dotted line represents the propulsion force Ft of the crank 105R, the chain line represents the loss force Fr of the left crank 105L, and the two-dotted chain line represents the loss force Fr of the right crank 105R. In addition, FIG. 16A illustrates the case of the sitting, and FIG. 16B illustrates the case of the dancing. As illustrated in FIGS. 16A and 16B, the differential value (Fs of FIG. 16A and Fd of FIG. 16B) between the maximum value of the propulsion force Ft and the maximum value of the loss force Fr is different in the sitting and the dancing.

This is because, in the case of the dancing, the weight is applied in the normal direction of the crank 105 on the 3 to 6 o'clock position of the crank 105 (90° to 180° of the crank rotation angle θ) due to the user's weight, and the loss force Fr in the normal direction of the crank 105 is larger than that in the case of the sitting.

Therefore, it can be determined whether the driver is dancing or sitting when a detected differential value between the maximum value of the propulsion force Ft and the maximum value of the loss force Fr is equal to or more than a certain value. Alternatively, it may also be determined a case where a ratio of the maximum value of the loss force Fr with respect to the maximum value of the propulsion force Ft is equal to or more than a certain value (that is, a case where a ratio of the maximum value of the propulsion force Ft to the maximum value of the loss force Fr is equal to or more than a certain value). In other words, the riding posture is determined on the basis of a comparison value between the maximum value (first predetermined state) of the component (the propulsion force Ft) of the force in the rotational direction and the maximum value (second predetermined state) of the component (the loss force Fr) of the force in the longitudinal direction.

In a case where such a certain value is set to the threshold and the ratio is equal to or more than the threshold (or equal to or less than the threshold), it may be determined that the driver is dancing. The threshold may be obtained by an experiment or a simulation. For example, in the case of the ratio, when the maximum value of the loss force Fr/the maximum value of the propulsion force Ft is equal to or more than 80%, it may be determined that the driver is dancing.

Figure 17:
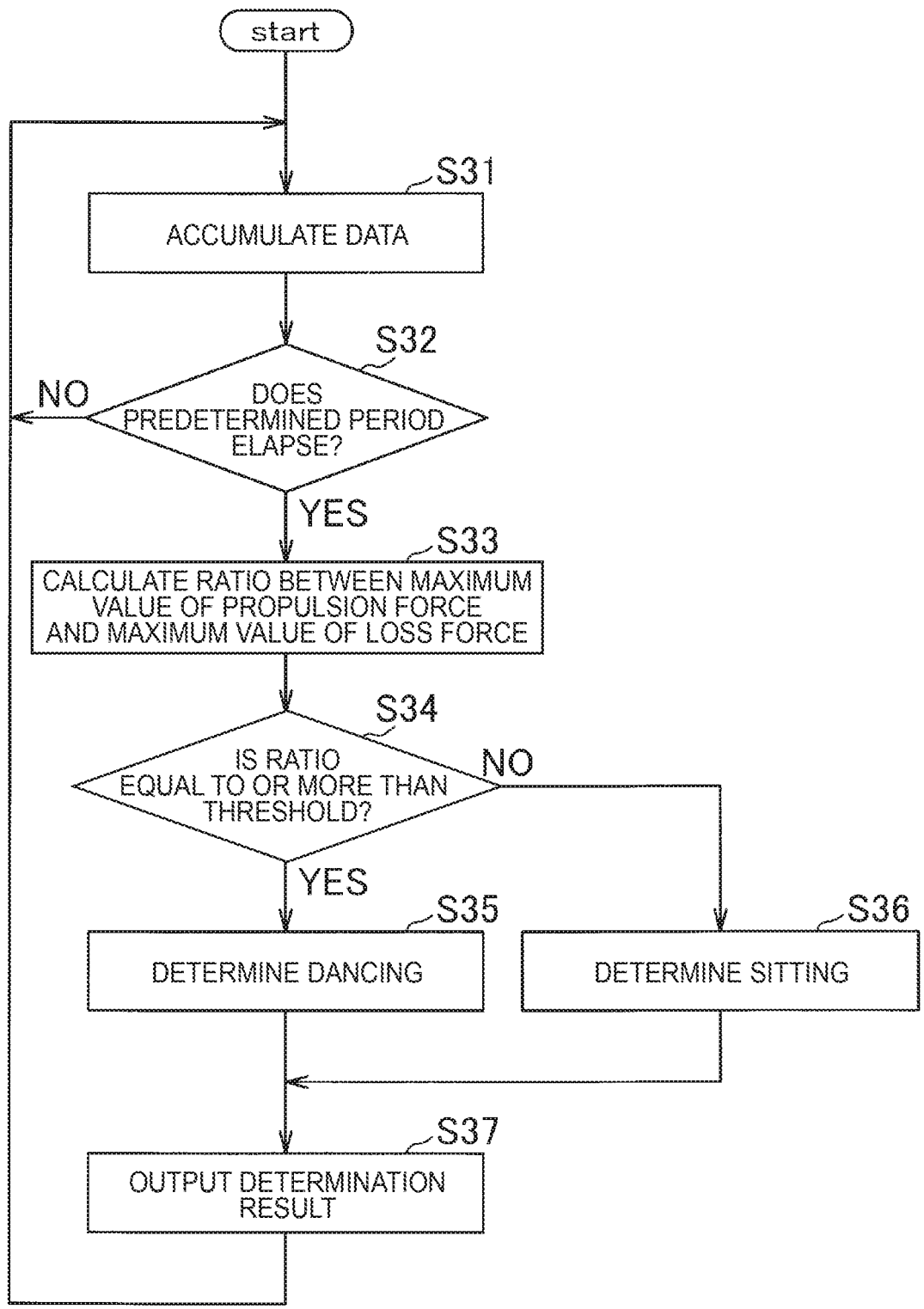
FIG. 17 is a flowchart of the riding posture outputting method in the riding posture outputting device according to the fourth embodiment of the invention.

FIG. 17 illustrates a flowchart of the riding posture outputting method according to this embodiment. The flowchart illustrates an example that the determination unit 411 performs the determination on the basis of the above ratio. First, the data (the propulsion force Ft and the loss force Fr) received from the cycle computer 201 is acquired and stored in the data storage unit 412 (Step S31). Next, it is determined whether a predetermined period of determining the riding posture (for example, the crank 105 rotates once) elapses (Step S32). In a case where the predetermined period does not elapse (NO), the procedure returns to Step S31.

In a case where the predetermined period elapses in Step S32 (YES), a ratio between the maximum value of the propulsion force Ft and the maximum value of the loss force Fr in this period is calculated (Step S33). Next, it is determined whether the calculated ratio is equal to or more than the threshold (Step S34). In a case where the ratio is equal to or more than the threshold (YES), it is determined that the driver is dancing (Step S35).

On the other hand, in a case where it is determined that the crank rotation angle is less than the threshold in Step S34 (NO), it is determined that the driver is sitting (Step S36).

Then, a result determined in Step S35 or S36 (determination result) is output from the communication unit 413 (Step S37). Further, the determination result may be stored in the data storage unit 412, and may be output according to a request from the computer 501.

According to this embodiment, there are provided the acquisition unit (the communication unit 413) which acquires the information on the component of the force (the loss force Fr) in the longitudinal direction of the crank 105 and the information on the component of the force in the rotational direction (the propulsion force Ft) of the crank 105 among the forces added to the crank 105 of the bicycle 1, and the output unit (the determination unit 411) which determines the riding posture of the driver of the bicycle 1 on the basis of the comparison value obtained by comparing the loss force Fr and the propulsion force Ft in a predetermined state (maximum value) and outputs the information on the riding posture. In this way, the dancing can be determined on the basis of the propulsion force Ft and the loss force Fr. In addition, since the information of the crank rotation angle θ is not necessary in this case, the data amount to be received by the server 401 can be reduced. Therefore, the communication amount and the capacity of the hard disk drive and the memory can be saved.

Further, even in this embodiment, the period of determining the maximum value may be not limited to one rotation of the crank 105, but may be determined at a plurality of times or within one rotation. In addition, the maximum value may be a value at every 30° calculated from the data accumulated in the data storage unit 412, or may be an estimated value obtained by interpolating the values at every 30°.

Further, it is a matter of course that the dancing may be determined by any one of the right crank 105R and the left crank 105L, and may also be determined on the basis of the detection results of both cranks 105.

Fifth Embodiment

Next, a riding posture outputting device according to a fifth embodiment of the invention will be described with reference to FIGS. 18 and 19. Further, the same portions as those in the first embodiment will be denoted with the same symbols, and the descriptions of the same symbols will be omitted.

In this embodiment, the configurations of the measurement module 301, the cycle computer 201, and the server 401 are the same as those of the first embodiment, but the method of determining the dancing or sitting is different.

Figure 18A:
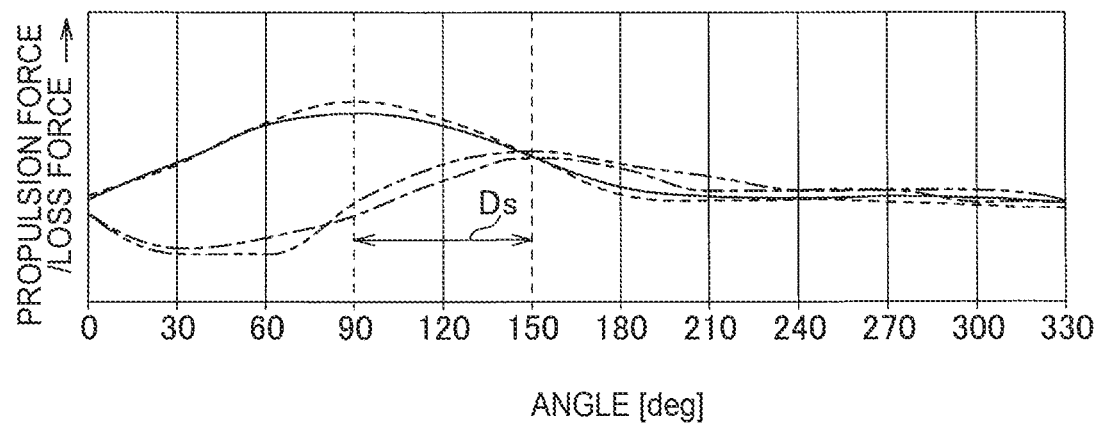
FIGS. 18A and 18B are graphs illustrating a variation with respect to the crank rotation angles of the propulsion force and the loss force in the riding posture outputting device according to a fifth embodiment of the invention.
Figure 18B:
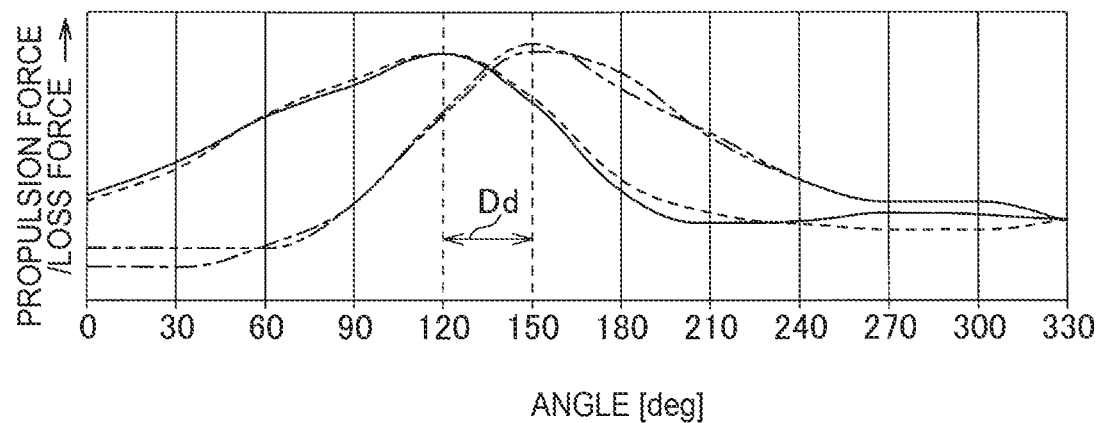

FIGS. 18A and 18B illustrate graphs of a variation with respect to the crank rotation angle θ in the tangential direction and the normal direction of rotation of the crank 105 (that is, the propulsion force Ft and the loss force Fr). These drawings are the same as FIGS. 16A and 16B. As illustrated in FIGS. 18A and 18B, the differential value (Ds of FIG. 18A and Dd of FIG. 18B) between the crank rotation angle θ of the maximum value of the propulsion force Ft and the crank rotation angle θ of the maximum value of the loss force Fr is different in the sitting and the dancing.

Since the loss force Fr is a force in the normal direction of the crank 105, the maximum value becomes large at an angle at which the weight is applied to the pedal 103. Therefore, since the user's weight is applied at the time of the dancing, and the weight of the user's feet (part of the weight) is applied at the time of the sitting, the angle of the maximum value is almost not changed in the dancing and the sitting. On this regard, since the propulsion force Ft is a force in the tangential direction of the crank 105, even when the weight is applied on the pedal 103 at the 3 o'clock position (the crank rotation angle θ=90°) of the crank 105 at the time of the dancing, it takes a time for moving the load of the weight right and left. Therefore, the peak crank rotation angle θ applied with the weight is delayed by 90°. Therefore, the crank rotation angle θ at which the load F is maximized becomes 90° or more. With this regard, since the body does not swing side to side in the case of the sitting, the load F is maximized when the crank rotation angle θ is near at 90°. Therefore, the rotation angle of the maximum value of the propulsion force Fr approaches the rotation angle of the maximum value of the loss force Ft at the time of the dancing.

Therefore, when it is detected that the differential value between the crank rotation angle θ of the maximum value (predetermined state) of the propulsion force Ft and the crank rotation angle θ of the maximum value (predetermined state) of the loss force Fr is equal to or less than a predetermined value, it is possible to determine whether the driver is dancing or sitting. In other words, the riding posture is determined on the basis of the comparison value between the rotation angle of the crank 105 at which the component (the propulsion force Ft) of the force in the rotational direction is maximized and the rotation angle of the crank 105 at which the component (the loss force Fr) of the force in the longitudinal direction is maximized.

In a case where the above-described certain value is set to the threshold and the differential value is equal to or less than the threshold, it may be determined that the driver is dancing. The threshold may be obtained by an experiment or a simulation.

In a case where such a certain value is set to the threshold and the ratio is equal to or more than the threshold (or equal to or less than the threshold), it may be determined that the driver is dancing. The threshold may be obtained by an experiment or a simulation.

Figure 19:
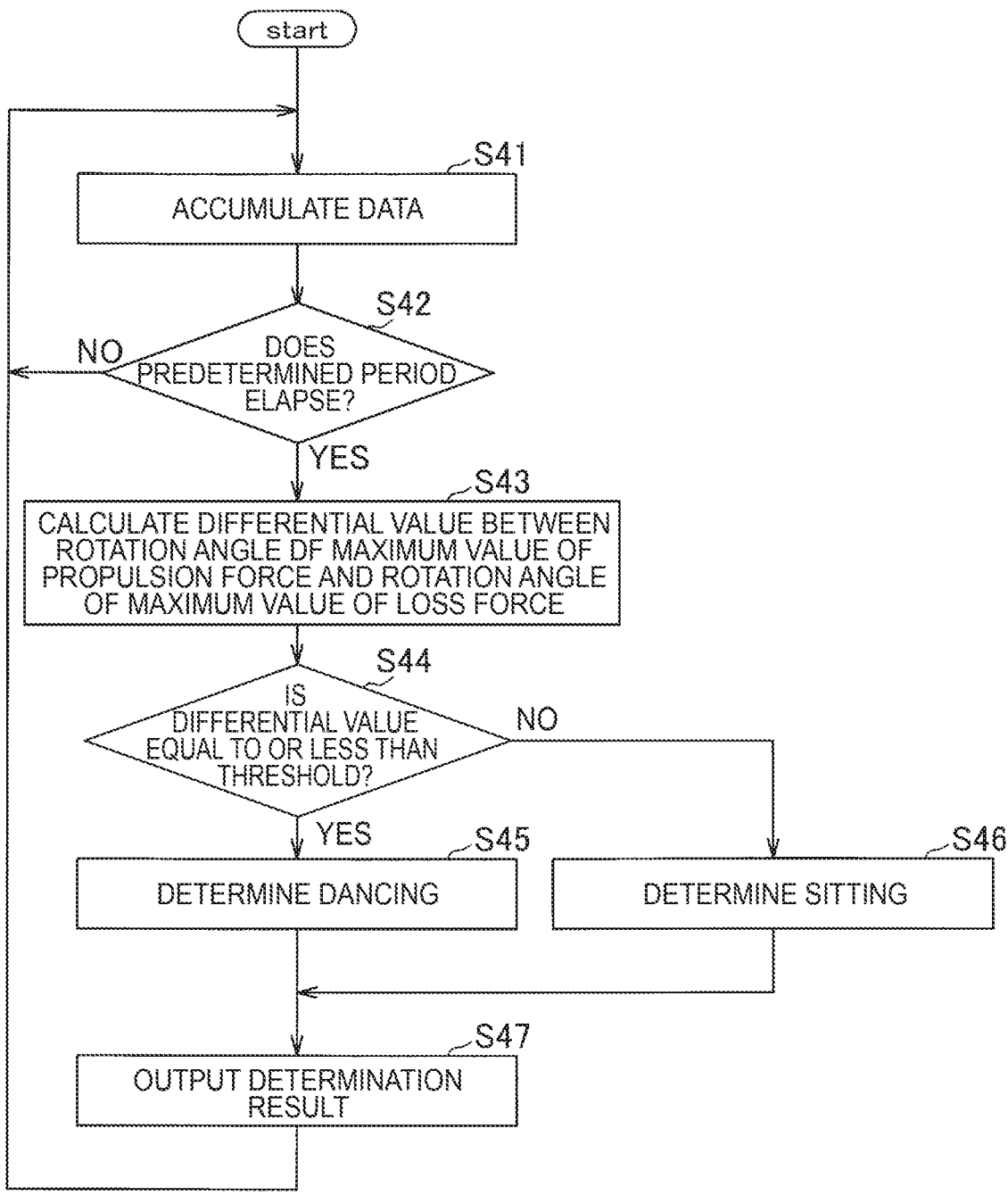
FIG. 19 is a flowchart of the riding posture outputting method in the riding posture outputting device according to the fifth embodiment of the invention.

FIG. 19 illustrates a flowchart of the riding posture outputting method according to this embodiment. The flowchart is performed by the determination unit 411. First, the data (the propulsion force Ft, the loss force Fr, and the crank rotation angle θ) received from the cycle computer 201 is stored in the data storage unit 412 (Step S41). Next, it is determined whether the predetermined period of determining the riding posture (for example, the crank 105 rotates once) elapses (Step S42). In a case where the predetermined period does not elapse (NO), the procedure returns to Step S41.

In a case where the predetermined period elapses in Step S42 (YES), a differential value between the rotation angle of the maximum value of the propulsion force Ft and the rotation angle of the maximum value of the loss force Fr in this period is calculated (Step S43). Next, it is determined whether the calculated ratio is equal to or less than the threshold (Step S44). In a case where the calculated ratio is equal to or more than the threshold (YES), it is determined that the driver is dancing (Step S45).

On the other hand, in a case where it is determined that the calculated ratio is less than the threshold in Step S44 (NO), it is determined that the driver is sitting (Step S46).

Then, the result (the determination result) determined in Step S45 or S46 is output from the communication unit 413 (Step S47). Further, the determination result may be stored in the data storage unit 412, and may be output according to a request from the computer 501.

According to this embodiment, there are provided the acquisition unit (the communication unit 413) which acquires the information (the loss force Fr) on the component of the force in the longitudinal direction of the crank 105, the information (the propulsion force Ft) on the component of the force in the rotational direction of the crank 105 in the rotation angle among the forces applied to the crank 105, the angle information (the crank rotation angle θ) on the rotation angle of the crank 105 of the bicycle 1, and the output unit (the determination unit 411) which determines the riding posture of the driver of the bicycle 1 is determined on the basis of the comparison value obtained by comparing the crank rotation angles θ when the loss force Fr and the propulsion force Ft each become a predetermined state (maximum value) and outputs information on the riding posture. In this way, the dancing can be determined on the basis of the propulsion force Ft, the loss force Fr, and the crank rotation angle θ.

Further, even in this embodiment, the period of determining the maximum value may be not limited to one rotation of the crank 105, but be determined at a plurality of times or may be within one rotation. In addition, each maximum value may be a value for every 30° calculated from the data accumulated in the data storage unit 412, and may be a value estimated by interpolation on the basis of the value at every 30° as described in the first embodiment.

In addition, the determination target is not limited to the differential value between the crank rotation angles θ when the propulsion force Ft and the loss force Fr are maximized, but may be a time difference.

Further, it is a matter of course that the dancing may be determined by any one of the right crank 105R and the left crank 105L, and may also be determined on the basis of the detection results of both cranks 105.

Sixth Embodiment

Next, a riding posture outputting device according to a sixth embodiment of the invention will be described. Further, the same portions as those in the first to fifth embodiments will be denoted with the same symbols, and the descriptions of the same symbols will be omitted.

In this embodiment, the riding posture (that is, dancing) is determined in combination of the first to fifth embodiments. In other words, calculation values and detection values immediately before the dancing is determined in each embodiment are subjected to grading. In a case where a total sum of these values is equal to or more than a certain value, it is determined as the dancing.

Specifically, in the case of the maximum value of the load F illustrated in the first embodiment, "−1" point is graded when the position of the crank 105 is the 2 o'clock (the crank rotation angle θ becomes 60°) at which the load F is maximized, "0" point when the position is the 3 o'clock or more and the 4 o'clock or less (the crank rotation angle θ is 90°≤θ<120°), "+1" point when the position is the 4 o'clock or more and 5 o'clock or less (the crank rotation angle θ is 120°≤θ<150°), and "+2" point when the position is the 5 o'clock or more and the 6 o'clock or less (the crank rotation angle θ is 150°≤θ<180°).

In the case of the maximum value of the propulsion force Ft illustrated in the second embodiment, "0" point is graded when the position of the crank 105 at which the propulsion force Ft is maximized is the 3 o'clock (the crank rotation angle θ is 90°), and "+1" point in other cases.

In the case of the differential value between the maximum value and the minimum value of the loss force Fr illustrated in the third embodiment, the differential value is set to "+1" point when the differential value is equal to or more than the threshold (a value calculated on the basis of 60% of the user's weight), and "0" point when the differential value is less than the threshold.

In the case of the ratio of the loss force Fr to the maximum value of the propulsion force Ft illustrated in the fourth embodiment, "+2" point is graded when the ratio is 100% or more (the loss force Fr is large), "1" point when the ratio is 80% or more, and "0" point when the ratio is less than 80%.

In the case of the differential value between the rotation angle of the maximum value of the propulsion force Ft and the rotation angle of the maximum value of the loss force Fr illustrated in the fifth embodiment, "+1" point is graded when the differential value is within 30°, and "0" point when the differential value exceeds 30°.

Then, when the total sum of the values estimated in each embodiment is four points or more, it is determined that the driver is dancing.

Further, the method in this embodiment is not limited to the combination of all the first to fifth embodiments, and may be any combination of two or more embodiments. In addition, the total sum to determine the dancing may be appropriately changed according to a combination.

For example, the first embodiment may be combined with the second embodiment, and at least any one or more of the first embodiment and the second embodiment may be combined with at least one or more of the third to fifth embodiments.

According to this embodiment, the dancing is determined according to the combination of the first to fifth embodiments. Therefore, it is possible to determine the dancing with more accuracy compared to a case where the dancing is determined by one method.

Further, in the first to sixth embodiments, the strain gauge has been disposed in the crank 105. In a case where the crank is attached through a spider arm, the strain gauge may be attached to the spider arm, or may be attached to the pedal crank shaft 115. These components can also acquire information on the force applied to the crank 105. In addition, any sensor may be used besides the strain gauge as long as the sensor can acquire the information on the force applied to the crank 105.

In addition, the transmission of data from the cycle computer 201 to the server 401 is not limited to a scheme that the cycle computer 201 directly transmits the data through the Internet 601. For example, the cycle computer 201 may be connected to the computer 501 to transmit the data in a wired or wireless manner, and transmit the data from the computer 501 to the server 401. Alternatively, the data may be transmitted from the cycle computer 201 to the computer 501 through a memory card, and transmitted from the computer 501 to the server 401.

Further, the riding posture outputting device in the invention is not limited to the server 401, a computer or a tablet terminal of the user such as the computer 501 may be used, and the function of the riding posture outputting device may be installed in the cycle computer 201.

In addition, the man-powered machine in the invention is referred to a machine such as the bicycle 1 or a fitness bicycle which is provided with the crank 105 (a crank arm 78) and driven according to a man power. In other words, any man-powered machine may be employed as long as the machine is provided with the crank 105 and driven by the man power (there is no need to move in space).

In addition, the invention is not limited to the above embodiments. In other words, a person skilled in the art may make various changes in a scope not departing from the spirit of the invention on the basis of knowledge of the related art. These changes are also included in the range of the invention as long as the configuration of the riding posture outputting device of the invention is provided.

REFERENCE SIGNS LIST

1 bicycle (man-powered machine)
3 frame
105 crank
401 server (riding posture outputting device)
411 determination unit (acquisition unit, output unit)
412 data storage unit
413 communication unit (acquisition unit)
F load (force information)
Fr loss force (force information, information on component of force in longitudinal direction of crank)
Ft propulsion force (force information, information on component of force in rotational direction of crank)
θ crank rotation angle (angle information)

The invention claimed is:
1. A riding posture outputting device comprising:
a processor configured to acquire angle information on a rotation angle of a crank of a man-powered machine, and force information on a force applied to the crank in the rotation angle, detect a peak rotation angle at which the force indicated by the force information is maximized, and to output information regarding whether or not a riding posture of a driver of the crank is dancing or whether or not the riding posture of the driver of the crank is seated, depending on whether or not the peak rotation angle of the crank exceeds a predetermined threshold, while the crank rotates within a predetermined rotation period,
wherein the processor changes the predetermined threshold depending on a magnitude of the force applied to the crank.

2. The riding posture outputting device according to claim 1, wherein the predetermined rotation period is one rotation.

3. The riding posture outputting device according to claim 2,
wherein the force includes a tangential direction force component and a normal direction force component of crank rotation.

4. The riding posture outputting device according to claim 2,
wherein the force is a tangential direction force component of crank rotation.

5. A riding posture determining method comprising:
acquiring angle information on a rotation angle of a crank of a man-powered machine, and force information on a force applied to the crank in the rotation angle;
detecting a peak rotation angle at which the force indicated by the force information is maximized; and
outputting information about whether or not the riding posture of a driver of the crank is dancing, or whether or not the riding posture of the driver is seated, depending on whether or not the peak rotation angle of the crank exceeds a predetermined threshold, while the crank rotates within a predetermined rotation period,
wherein the predetermined threshold is changed depending on a magnitude of the force applied to the crank.

6. The riding posture determining method according to claim 5, wherein the predetermined rotation period is one rotation.

7. The riding posture determining method according to claim 5,
wherein the force includes a tangential direction force component and a normal direction force component of crank rotation.

8. The riding posture determining method according to claim 5,
wherein the force is a tangential direction force component of crank rotation.

* * * * *